United States Patent
Aoki et al.

[11] Patent Number: 6,027,032
[45] Date of Patent: *Feb. 22, 2000

[54] HEATING APPARATUS FOR VEHICLE, HAVING HEAT-GENERATING UNIT

[75] Inventors: Shinji Aoki, Kariya; Toshio Morikawa, Toyota; Hajime Ito, Kariya; Yasushi Kato; Goro Uchida, both of Toyota; Takashi Ban, Kariya, all of Japan

[73] Assignees: Denso Corporation Kariya; Toyota Jidosha Kabushiki Kaisha Toyota; Kabushiki Kaisha Toyoda Jidoshokki Seisakusho, Kariya, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/915,155

[22] Filed: Aug. 20, 1997

[30] Foreign Application Priority Data

Aug. 21, 1996 [JP] Japan .................................. 8-220080
Oct. 25, 1996 [JP] Japan .................................. 8-284044

[51] Int. Cl.$^7$ .................................................. B60H 1/02
[52] U.S. Cl. ........................ 237/12.3 R; 122/26; 126/247
[58] Field of Search ..................... 237/12.3 R, 12.3 B; 122/26; 126/247

[56] References Cited

U.S. PATENT DOCUMENTS 4,733,635  3/1988  Menard et al. .................... 237/12.3 R
4,773,388  9/1988  Herbulot et al. ....................... 126/247
4,993,377  2/1991  Itakura .

FOREIGN PATENT DOCUMENTS 6-092134  4/1994  Japan .

*Primary Examiner*—Henry A. Bennett
*Assistant Examiner*—Derek S. Boles
*Attorney, Agent, or Firm*—Harness, Dickey & Pierce, PLC

[57] ABSTRACT

According to the present invention, in a heating apparatus having a viscous heater using viscous fluid for heating cooling water, when an engine rotational speed is lower than a set rotational speed relative to a temperature of viscous fluid, a viscous clutch is turned on to transmit a rotational driving force of the engine to a rotor of the viscous heater. In this way, a shearing force is applied to the viscous fluid in the heat-generating chamber, and the circulating cooling water is heated by generated heat of the viscous fluid to improve the heating capacity. When the engine rotational speed is higher than the set rotational speed relative to a temperature of viscous fluid, a viscous clutch is not turned on. Therefore, the rotational driving force of the engine is not transmitted to the rotor of the viscous heater, so that the shearing force is not applied to the viscous fluid to prevent the oil temperature of the viscous fluid from increasing excessively higher than 200° C.

12 Claims, 16 Drawing Sheets

HEATING APPARATUS FOR VEHICLE, HAVING HEAT-GENERATING UNIT

CROSS REFERENCE TO THE RELATED APPLICATIONS

This application is based on and claims priority of Japanese Patent Applications of Nos. Hei. 8-220080 filed on Aug. 21, 1996, and Hei. 8-284044 filed on Oct. 25, 1996, the contents of which are incorporated herein by reference.

BACKGROUND OF THE INVENTION

1. Field of the Invention

The present invention relates to a heating apparatus for a vehicle, which is provided with a heat-generating unit using a shearing force, for increasing a temperature of cooling water for cooling a water-cooled engine.

2. Description of Related Art

Conventionally, as a heating apparatus for a vehicle, there has been generally known a hot water type heating apparatus for heating a passenger compartment, in which cooling water for cooling a water-cooled engine is supplied to a heater core disposed in a duct, and air heated while passing through the heater core is blown into the passenger compartment by a blower to heat the passenger compartment.

Further, in a case of the vehicle where the heat amount generated by the engine is small, such as a vehicle having a diesel engine or a lean burn engine, because the heat amount generated by the engine is too small to heat the cooling water sufficiently, a temperature of the cooling water in the cooling water circuit cannot be maintained at a predetermined temperature (for example, 80° C.), there occurs a problem in that a heating capacity for the passenger compartment is insufficient.

To overcome such a problem, as disclosed in JP-A-2-246823, there has been conventionally proposed a heating apparatus for a vehicle in which a heat-generating unit using a shearing force, for heating cooling water to be supplied to a heater core, is disposed in a cooling water circuit.

The heat-generating unit transmits a rotational driving force of the engine to a shaft through a belt transmitting mechanism and the electromagnetic clutch, a heat-generating chamber is formed in a housing, and a cooling water passage is formed at an outer periphery of the heat-generating chamber. Further, a rotor which rotates integrally with the shaft is disposed in the heat-generating chamber, and a shearing force generated by a rotation of the rotor is applied to viscous fluid such as silicon oil sealed in the heat-generating chamber to generate heat. The cooling water is heated by the generated heat.

However, when a water valve for adjusting a radiating amount of the heater core is disposed on the midway of a cooling water pipe for connecting the heat-generating unit and the heater core, if the water valve is closed, the cooling water does not circulate into the cooling water circuit of the heat-generating unit, with the result that there occurs a problem in that the viscous fluid in the heat-generating chamber is heated abnormally.

Especially when high-viscosity silicon oil is used as the viscous fluid, if a temperature of oil itself as a material of the high-viscosity silicon oil is heated abnormally up to 250° C. or more, there is a possibility that a mechanical deterioration or a thermal deterioration due to the shearing force of the rotor generates. Once the mechanical deterioration or a thermal deterioration generates as described above, the viscosity of the viscous fluid lowers. In this way, thereafter, even if the shearing force is applied to the viscous fluid by the rotor, heat-generating efficiency lowers, and there occurs a problem in that sufficient heating capacity cannot be obtained when the heating operation for the passenger compartment is necessary.

SUMMARY OF THE INVENTION

In view of the above-described problems, it is accordingly an object of the present invention to provide a heating apparatus for a vehicle, capable of preventing the viscous fluid from being heated abnormally.

Further, it is another object of the present invention is to provide a heating apparatus for a vehicle, capable of obtaining sufficient heating capacity when the heating operation for the passenger compartment is necessary, by optimizing a used condition of the heat-generating unit.

According to the present invention, a heating apparatus for a vehicle includes a heating heat exchanger for heating a passenger compartment of the vehicle by heat-exchanging between cooling water having cooled a water-cooled engine and air to be blown into the passenger compartment, a heat-generating having a rotor which rotates when a rotational driving force of the engine is applied thereto, and a heat-generating chamber for sealing therein viscous fluid which generates heat when a shearing force generated by a rotational driving force of the rotor is applied thereto, shearing state switching means for switching a shearing state of the viscous fluid by the rotational driving force from the engine to the rotor, and physical amount detecting means for detecting a physical amount relative to a rotational speed of the rotor. When the physical amount detected by the physical amount detecting means is less than a predetermined value, a heating control unit controls the shearing state switching means to reduce loads of the engine. Accordingly, a large shearing force is not applied to the viscous fluid in the heat-generating chamber. Therefore, since the temperature of the viscous fluid is prevented from increasing excessively, the mechanical deterioration or the thermal deterioration of the viscous fluid can be prevented. In this way, since the viscosity and the heat generating efficiency of the viscous fluid can be suppressed from being lowered, the cooling water to be supplied from the engine to the heating heat exchanger is heated sufficiently, and the heating capacity can be suppressed from being deteriorated.

The heating control unit may control the shearing state switching means to minimize loads of the engine when the physical amount detected by the physical amount detecting means is more than a predetermined value.

Further, the shearing state switching means may be a driving force transmitting unit for transmitting the rotational driving force of the engine to the rotor.

Still further, the driving force transmitting unit may include a belt transmitting mechanism for transmitting the rotational driving force of the engine to a rotating body of an auxiliary equipment for the engine with said rotor. In this case, the physical amount detecting means is a rotational speed sensor for detecting a rotational speed of the rotating body.

Further, the physical amount detecting means may be operating state detecting means for detecting an operating state of the engine.

Still further, the driving force transmitting unit may include a clutch for intermitting a transmission of the rotational driving force from the engine to said rotor of the heat-generating unit. In this case, the physical amount detecting means is a rotational speed sensor for detecting a rotational speed of the clutch.

Further, the heating apparatus may further include a cooling water temperature sensor for detecting a temperature of the cooling water, and the heating control unit controls said shearing state switching means in accordance with the temperature of the cooling water, detected by the cooling water temperature sensor.

Instead of the physical amount detecting means for detecting a physical amount relative to a rotational speed of the rotor, there may be employed physical amount detecting means for detecting a physical amount relative to a temperature of the viscous fluid in said heat-generating chamber.

BRIEF DESCRIPTION OF THE ACCOMPANYING DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
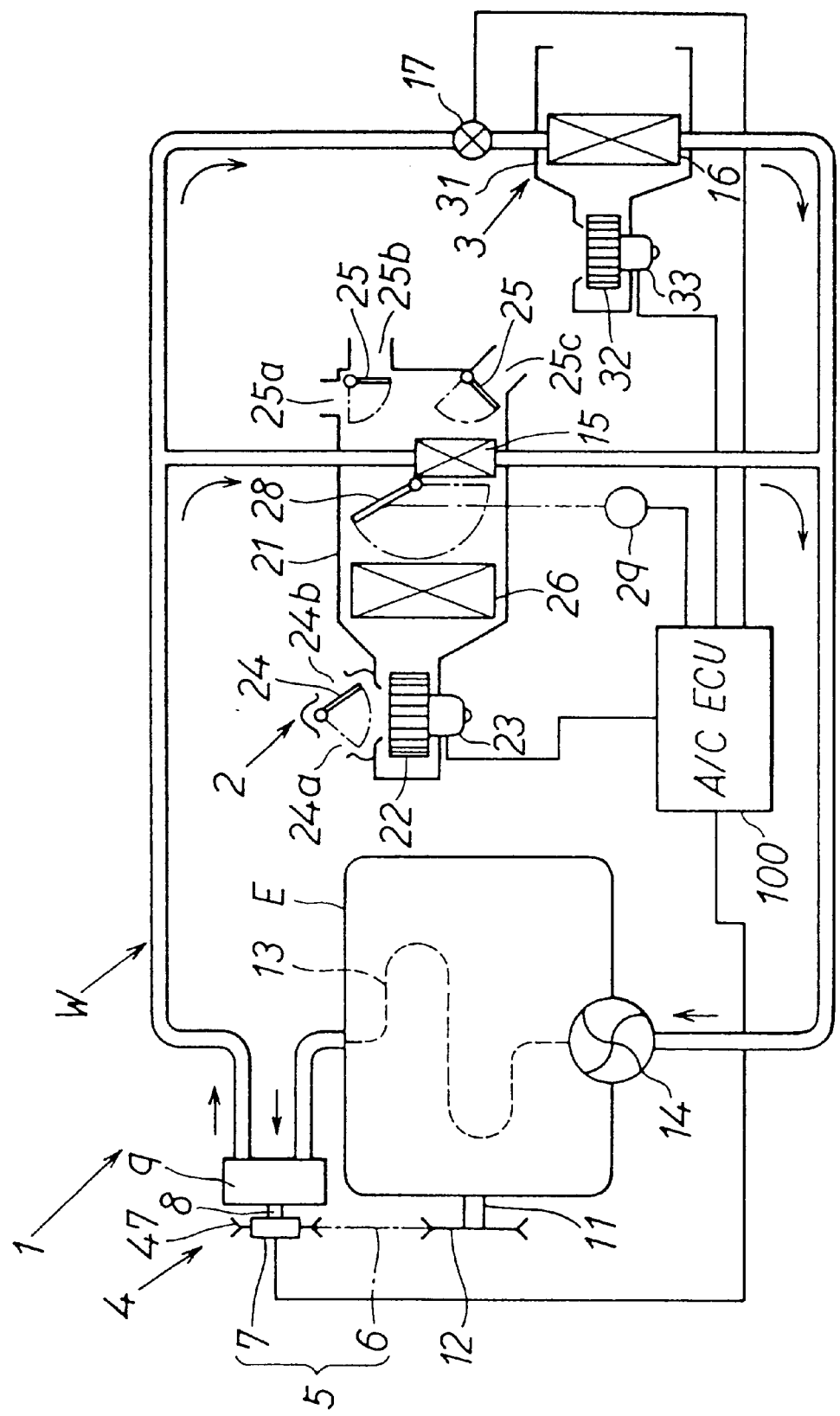
FIG. 1 is a schematic view showing an entire structure of an air conditioning apparatus for a vehicle, according to a first embodiment of the present invention.
Figure 2:
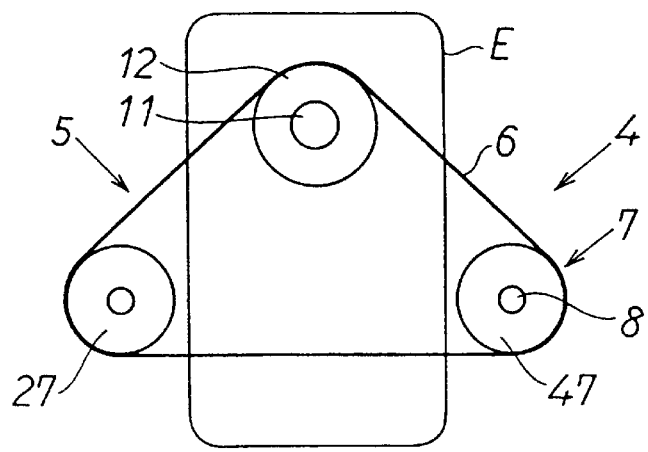
FIG. 2 is a schematic view showing an engine and a belt transmission mechanism in the first embodiment.

FIGS. 1 to 9 show a first embodiment of the present invention. FIG. 1 shows an entire structure of an air conditioning apparatus for a vehicle, and FIG. 2 shows an engine and a belt transmission mechanism.

An air conditioning apparatus 1 for a vehicle is equipped with a water-cooled diesel engine E (hereinafter referred to as "engine") disposed in a engine compartment of a vehicle, an air conditioning unit (hereinafter referred to as "A/C unit") 2 for air-conditioning a passenger compartment, a rear heating unit 3 for heating a rear-side of the passenger compartment, a heat-generating unit 4 using a shearing force, for heating cooling water for cooling the engine E, an air-conditioning ECU 100 (hereinafter referred to as "A/C ECU") for controlling the air-conditioning unit 2 and the rear heating unit 3, an engine ECU 200 (hereinafter referred to as "E/G ECU") for controlling the engine E, and the like.

The engine E is provided with a water jacket around a cylinder block and a cylinder head. To an output shaft (crankshaft) 11 of the engine E, there is attached a crank pulley 12 connecting to a V-belt 6 (described later). The water jacket 13 is disposed in a cooling water circuit W through which the cooling water circulates.

In the cooling water circuit W, there is disposed a water pump 14 for compulsorily pumping the cooling water, a radiator (not shown) for cooling the cooling water by heat-exchanging the cooling water and air, a front heater core 15 for heating air by heat-exchanging the cooling water and air, a rear heater core 16 for heating air by heat-exchanging the cooling water and air, a water valve for controlling a supply and an interruption of the cooling water into the rear heater core 16, and the like. The water pump 14 is disposed at an upstream side of the water jacket 13 of the engine E and is rotated by the output shaft 11 of the engine E.

The A/C unit 2 is constructed by a front duct 21, a front blower 22, a refrigeration cycle, a front heater core, and the like. At an upwind side of the front duct 21, there is rotatably provided an inside air/outside air switching damper 24 for selectively opening and closing an outside air inlet 24a and an inside air inlet 24b to switch an air inlet mode. At an downwind side of the front duct 21, there is rotatably provided a mode switching damper 25 for selectively opening and closing a defroster air outlet 25a, a defroster air outlet 25b and a foot air outlet 25c to switch an air outlet mode.

The front blower 22 is rotated by a blower motor 23 to generate an air flow toward the passenger compartment in the front duct 21.

The refrigeration cycle is composed of a compressor (auxiliary equipment for the engine, refrigerant compressor), a condenser (refrigerant condenser), a receiver (gas-liquid separator), an expansion valve (decompressing device), an evaporator (refrigerant evaporator), a refrigerant pipe for circularly connecting these components, and the like.

The compressor is equipped with an electromagnetic clutch (hereinafter referred to as "A/C clutch") 27, and compresses refrigerant sucked from the evaporator 26 and discharges the compressed refrigerant toward the condenser. The A/C clutch 27 is connected to a crank pulley 12 (see FIGS. 1 and 2) attached to the output shaft 11 of the engine E through the V-belt 6. When an electric current is supplied to an electromagnetic coil of the clutch 27, an output portion (armature, inner hub) is attracted to an input portion (rotor) so that a rotational power is transmitted to the compressor. The evaporator 26 is disposed in the front duct 21 to cool air flowing therethrough.

The front heater core 15 is disposed within the front duct 21 at a downstream side (upwind side) of the evaporator 26 with reference to the air flow direction and is connected to the cooling water circuit W at a downstream side of the heat-generating unit 4 with reference to the flow direction of the cooling water. The front heater core 15 heats air by heat-exchanging the air having passed through the evaporator 26 and the cooling water.

At an upwind side of the front heater core 15, there is rotatably provided an air-mixing damper 28. The air-mixing damper 28 adjusts a ratio between an amount of air (warm air) passing through the front heater core 15 and an amount of air (cool air) bypassing the front heater core 15 so that a temperature of air blown out into the passenger compartment can be adjusted. The air mixing damper 28 is actuated by an actuator (damper actuating means) such as a servomotor 29 through one or plural link plate(s).

The rear heating unit 3 is constructed by a rear duct 31, a rear blower 32, a rear heater core 16, and the like. At a downwind side of the rear duct 31, there is opened a foot air outlet (not shown).

The rear blower 32 is rotated by a blower motor 33 to generate an air flow toward the passenger compartment within the rear duct 31.

The rear heater core 16 is disposed in the rear duct 31 and is connected to the cooling water circuit W at a downstream side of the heat-generating unit 4 with reference to the flow direction of the cooling water through a water valve 17. The rear heater core 16 heats air by heat-exchanging air passing through the rear duct 31 and the cooling water.

Figure 3:
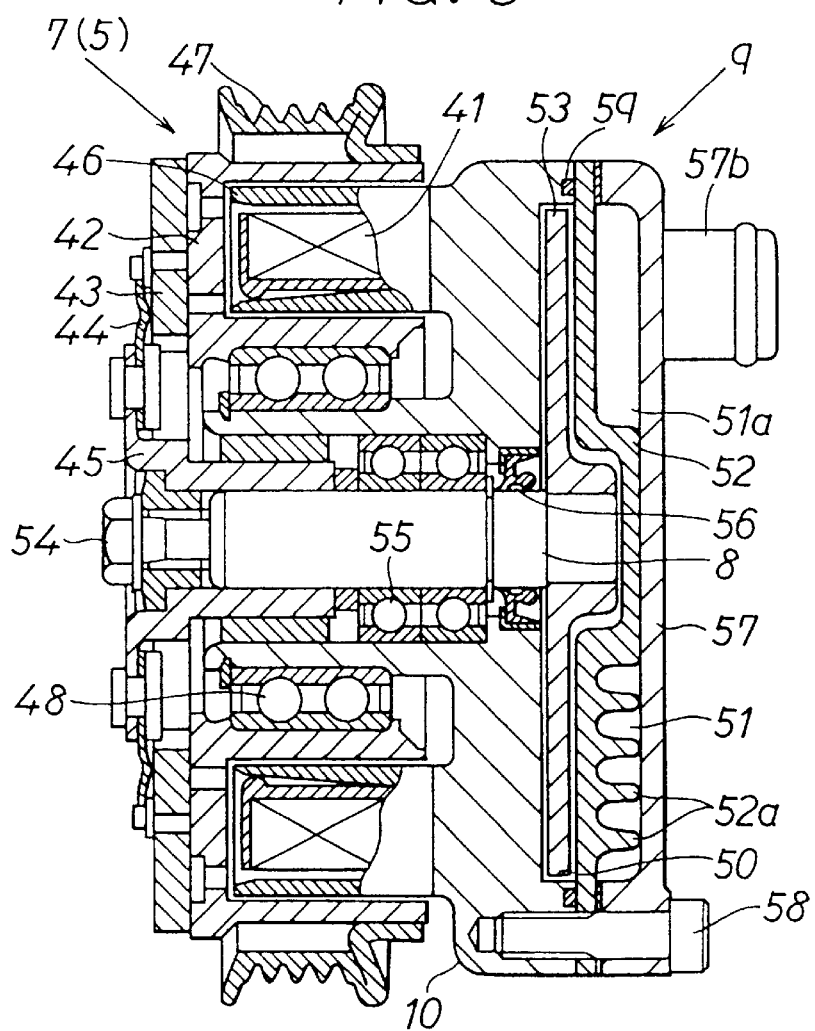
FIG. 3 is a cross sectional view showing a viscous clutch and a viscous heater in the first embodiment.
Figure 4:
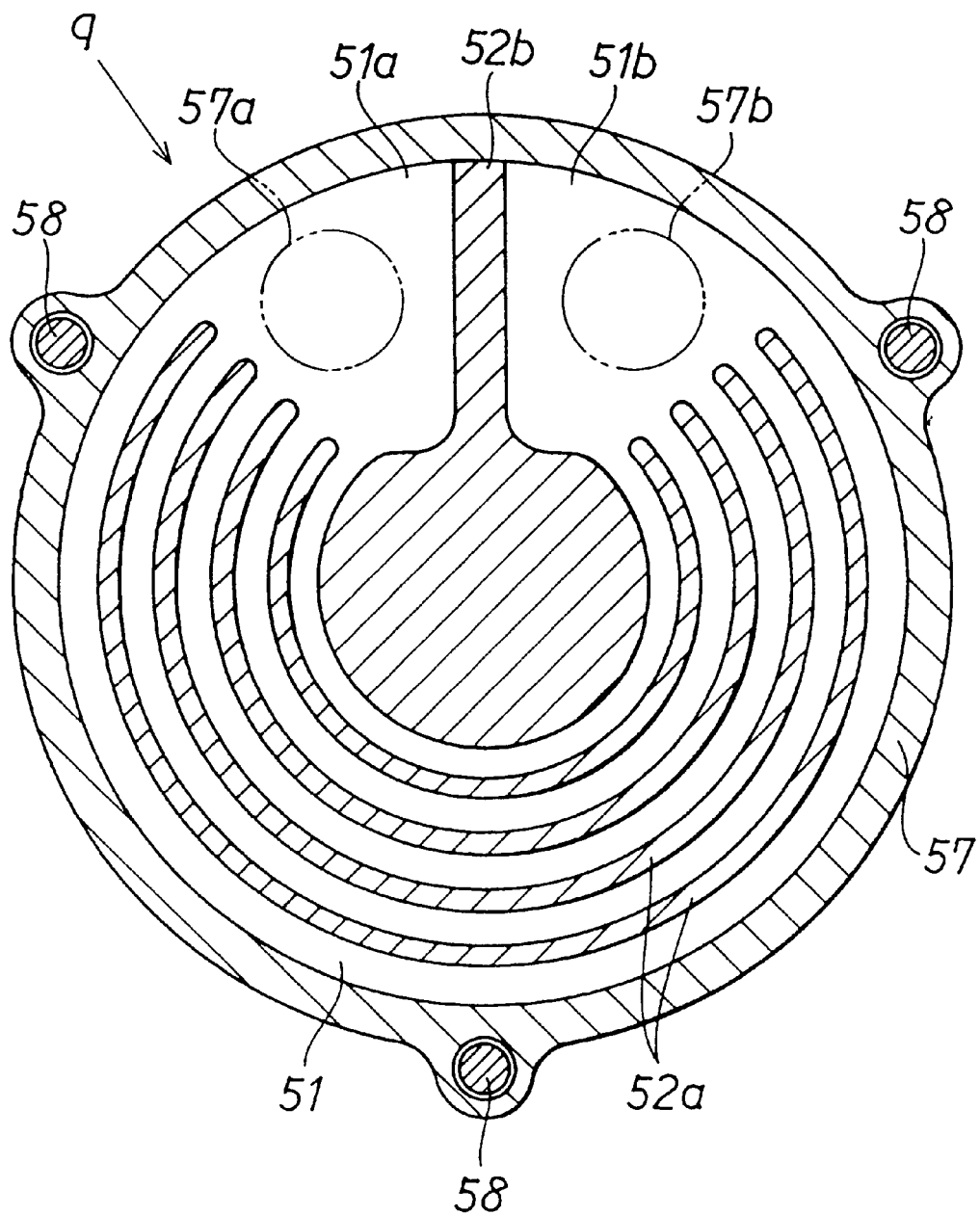
FIG. 4 is a cross sectional view showing the viscous heater in the first embodiment.

Next, the heat-generating unit 4 will be described briefly with reference to FIGS. 1–4. FIGS. 3 and 4 show the heat-generating unit 4.

The heat-generating unit 4 is composed of a belt transmitting mechanism 5 connected to and driven by the output shaft 11 of the engine E, and a heat-generating device 9 (hereinafter referred to as "viscous heater") having a shaft 8.

The belt transmitting mechanism 5 includes, as shown in FIGS. 1 and 2, a multi-stage type belt hung on the crank pulley attached to the output shaft 11, and an electromagnetic clutch 7 (hereinafter referred to as "viscous clutch") connected to and driven by the output shaft 11 (crank pulley 12).

The V-belt 6 transmits a rotational driving force (driving force) of the engine E to the shaft 8 of the viscous heater 9 through the viscous clutch 7. In this embodiment, the V-belt 6 is hung on the A/C clutch 27 and the viscous clutch 7.

The viscous clutch 7 is, as shown in FIG. 3, constructed by an electromagnetic coil 41 for generating a magnetomotive force when being electrified, a rotor 42 rotated by the engine E, an armature 43 attracted toward the rotor 42 by the magnetomotive force, an inner hub 45 connected to the armature 43 with a plate spring 44 and supplying a rotational driving force to the shaft 8 of the viscous heater 9, and the like.

The electromagnetic coil 41 is structured by winding a conductive lead wire covered with an insulating material. The electromagnetic coil 41 is disposed in the stator 46 and is fixedly molded in the stator 46 with an epoxy resin. The stator 46 is fixed on a front surface of a housing 10 of the viscous heater 9.

A V-pulley 47 hanging the V-belt 6 on a periphery thereof is joined to the rotor 42 by joining means such as welding and is a rotating body (input portion of the viscous clutch 7) which always rotates by a rotational driving force of the engine E, transmitted thereto through the V-belt 6. The rotor 42 is formed of magnetic material to have a U-shaped cross section and is rotatably supported on an outer periphery of the housing 10 of the viscous heater 9 with a bearing 48 disposed in an inner periphery thereof.

The armature 43 has a friction surface formed in a ring-shaped plate, which is opposed to a friction surface of the rotor 42, formed in a ring-shaped plate, by an air gap (e.g., a clearance of 0.5 mm) therebetween. The armature 43 is formed of magnetic material. When the armature 43 is attracted to the friction surface of the rotor 42 by the electromotive force of the electromagnetic coil 41, the rotational driving force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member for displacing the armature 43 in a direction (the left direction in the drawing) as to be separated (released) from the friction surface of the rotor 42 when the supply of the electric current to the electromagnetic coil 41 is stopped, to return the armature 43 to an initial position thereof.

The inner hub 45 is an output portion of the viscous clutch 7 such that the input side thereof is connected to and driven by the armature 43 through the plate spring 44 and the output side is connected to and driven by the shaft 8 of the viscous heater 9 with a spline fitting connection.

The viscous heater 9 is a supplementary heating source of the engine E which is the main heating source, and is constructed by the shaft 8 rotated by the engine E through the V-belt 6 and the viscous clutch 7, the housing 10 for rotatably supporting the shaft 8, a separator 52 for dividing an inner space of the housing 10 into a heat-generating chamber 50 and a cooling water passage 51, a rotor 53 rotatably disposed in the housing 10, and the like.

The shaft 8 is an input shaft which is fixedly fastened to the inner hub 45 of the viscous clutch 7 by fastening means such as a bolt 54 and rotates integrally with the armature 43. The shaft 8 is rotatably disposed in an inner periphery of the housing 10 with a bearing 55 and a sealing member 56. The sealing member 56 employs an oil-seal for preventing a leakage of the viscous fluid.

The housing 10 is made of a metallic member such as aluminum alloy. A cover 57 formed in a ring-shaped plate is fixedly fastened to a rear end of the housing 10 by fastening means 58 such as a bolt. On a surface where the housing 10 and the cover 57 are joined, there are disposed the separator 52 and a sealing member 59. The sealing member 59 employs an oil-seal for preventing a leakage of the viscous fluid.

The separator 52 is a partition member which is made of a metallic member such as aluminum alloy, which is superior in heat conductivity. An outer peripheral portion of the separator 52 is sandwiched between a cylindrical portion of the housing 10 and a cylindrical portion of the cover 57. Between a front end surface of the separator 52 and a rear end surface of the separator 52, there is formed the heat-generating chamber for sealing viscous fluid (e.g., silicon oil) which generates heat when a shearing force is applied thereto.

Between a rear end surface and the cover 57, there is formed the cooling water passage 51, which are liquid-tightly partitioned from the outside and in which the cooling water for cooling the engine E circulates. Further, on the rear end surface of the separator 52 at a lower side, there are integrally formed a plurality of fin portions 52a having a substantially arcuate shape, for transmitting heat of the viscous fluid to the cooling water efficiently.

Instead of the fin portions 52a, the rear end surface of the separator 52 may be formed in a convex and concave shape, or a heat transmission facilitating member such as a corrugated fin and a fine pin fin may be provided on an inner wall surface of the cover 57. Further, between the separator 52 and the rotor 53, there may be formed a labyrinth seal as the heat-generating chamber 50.

A partition wall 52b for partitioning an upstream side water passage 51a and a downstream side water passage 51b are formed to protrude from the rear end surface of the separator 52. To an outer wall portion of the cover 57, which is adjacent to the partition wall 52b, there are connected an inlet side cooling water pipe 57a into which the cooling water flows and an outlet side cooling water pipe 57b through which the cooling water flows out.

The rotor 53 is rotatably disposed in the heat-generating chamber 50 and is fixed to an outer periphery of the rear end portion of the shaft. On an outer peripheral surface or both side wall surfaces of the rotor 53, there are formed a plurality of groove portions (not shown). Between the adjacent groove portions, there is formed a protrusion portion. When the rotational driving force of the engine E is supplied to the shaft 8, the rotor 53 rotates integrally with the shaft 8 to generate a shearing force to the viscous fluid sealed in the heat-generating chamber 50.

Figure 5:
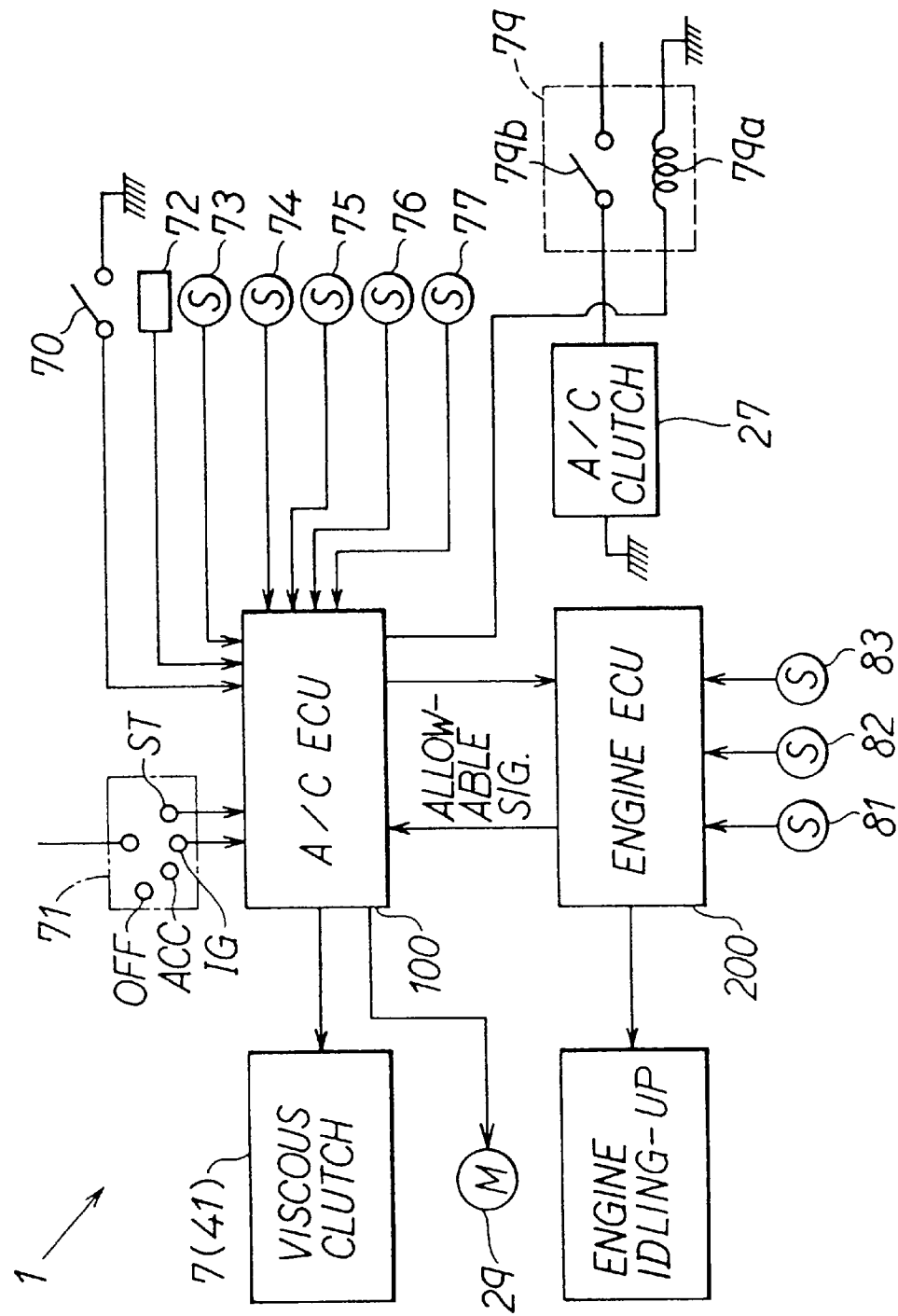
FIG. 5 is a block diagram showing an electric circuit of the air conditioning apparatus for a vehicle in the first embodiment.

Next, an A/C ECU 100 will be described briefly with reference to FIGS. 1, and 5–7. FIG. 5 shows an electric circuit of the air conditioning apparatus 1 for a vehicle.

The A/C ECU 100 is an electric circuit for performing a computer control for cooling and heating equipment of the compressor of the A/C unit 2, the viscous heater 9, and the like. The A/C ECU 100 is a microcomputer in which a CPU, a ROM, and a RAM are incorporated.

The A/C ECU 100 performs an air-conditioning control for the passenger compartment by controlling an cooling and heating equipment including the electromagnetic coil 41 of the viscous clutch 7, the front blower 22, the inside air/outside air switching door 24, the mode switching door 25, a servomotor 29 of the air-mixing damper 28, an air-conditioning clutch relay 79 and the rear blower 32, and the like, based on input signals from a viscous switch 70, an ignition switch 71, a temperature setting unit 72, an inside air temperature sensor 73, an outside air temperature sensor 74, a sunlight sensor 75, a cooling water temperature sensor 76, a post-evaporator temperature sensor 77, and the E/G ECU 200, a pre-stored control program (see FIG. 6), and the like.

A viscous switch 70 is for preferring a heating operation for the passenger compartment by using the viscous heater 9. When the viscous switch 70 is set on, a heating preference signal is output to the A/C ECU 100. The viscous switch 70 is an economical fuel consumption preference switch for giving an improvement of the fuel consumption rate (fuel economy) priority. When the viscous switch 70 is set on, a fuel consumption preference signal is output to the A/C ECU 100.

The ignition switch 71 includes each terminal of OFF, ACC, ST and IG. The terminal of OFF is a stator operating switch for outputting a signal to the A/C ECU 100 to supply an electric current to a starter.

The temperature setting unit 72 sets a temperature of the passenger compartment for a desired temperature and outputs a set temperature signal to the A/C ECU 100.

The inside air temperature sensor 73 employs a thermistor, for example, to detect a temperature of air in the passenger compartment (inside air temperature), and outputs an inside air temperature detection signal to the A/C ECU 100.

The outside air temperature sensor 74 employs a thermistor, for example, to detect a temperature of air outside the passenger compartment of the vehicle (outside air temperature), and outputs an outside air temperature detection signal to the A/C ECU 100.

The sunlight sensor 75 employs a photo-diode, for example, to detect an amount of sunlight entering the passenger compartment, and outputs a sunlight detection signal to the A/C ECU 100.

The cooling water temperature sensor 76 employs a thermistor, for example, to detect a temperature of the cooling water in the cooling water circuit W (in this embodiment, a temperature of the cooling water in the outlet side cooling water pipe 57b of the cooling water passage 51 of the viscous heater 9). The cooling water temperature sensor 76 outputs a cooling water temperature detection signal the A/C ECU 100.

The post-evaporator temperature sensor 77 employs a thermistor, for example, to detect detecting a temperature of air having been blown out from the evaporator 26, and outputs a post-evaporator temperature detection signal to the A/C ECU 100. Further, as means for detecting environmental conditions, there may be additionally employed an outlet air temperature sensor disposed in either one of air outlets of the front duct 21, for detecting a temperature of air blown out into the passenger compartment.

The air-conditioning clutch relay 79 is composed of a relay coil 79a and a relay switch 79b. When an electric current is supplied to the relay coil 79a, the relay switch 79b is closed. In this way, an electric current is supplied to the A/C clutch 28.

Figure 6:
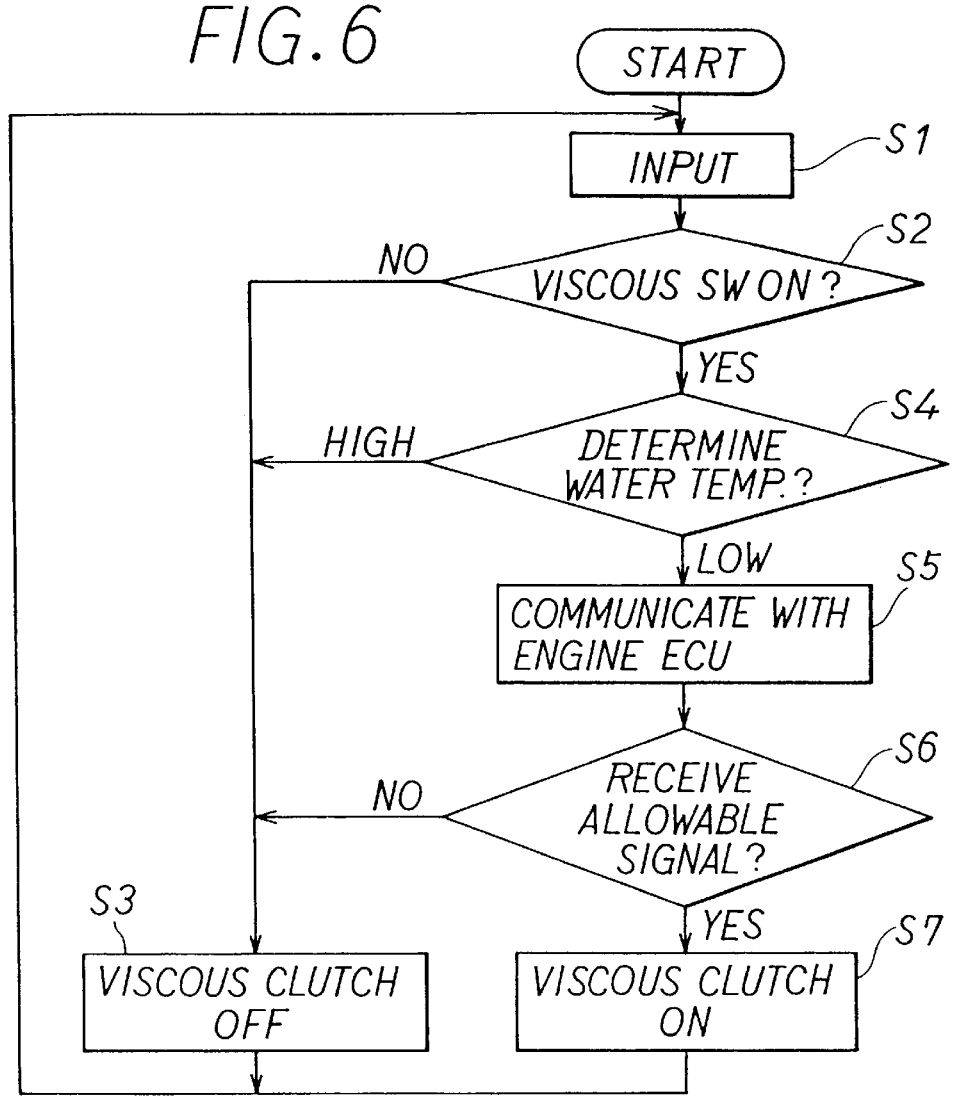
FIG. 6 is a flow chart showing a control program of an air conditioning ECU in the first embodiment.

Next, a control of the viscous heater 9 of the A/C ECU 100 will be described with reference to FIGS. 1–7. FIG. 6 shows a flow chart of a control program of the A/C ECU 100.

Firstly, various kinds of sensor signals and switch signals are input (physical amount detecting means, environmental condition detecting means, cooling water temperature detecting means: step S1).

Next, it is determined whether or not the viscous switch 70 is set on, i.e., whether or not the heating preference signal or the economical fuel consumption preference switch is input (viscous switch determining means: step S2). When the determination is "NO", it is not necessary to heat the passenger compartment and a priority is given on the improvement of the fuel consumption rate of the engine E.

Therefore, the electromagnetic coil 41 of viscous clutch 7 is turned off, i.e., the supply of the electric current to the electromagnetic coil 41 is stopped, and the rotor 53 of the viscous heater 9 is stopped rotating (step S3). Next, it proceeds to the process at step S1.

On the other hand, when the determination is "YES", it is determined whether the electromagnetic coil 41 of the viscous clutch 7 is set on or off according to characteristics graph (see FIG. 7) of the viscous heater control based on the cooling water temperature, pre-stored in a memory circuit (for example, ROM). That is, it is determined whether or not the cooling water temperature detected by the cooling water temperature sensor 76 is higher or lower than the set cooling water temperature (the set value) (cooling water temperature determining means: step S7).

Figure 7:
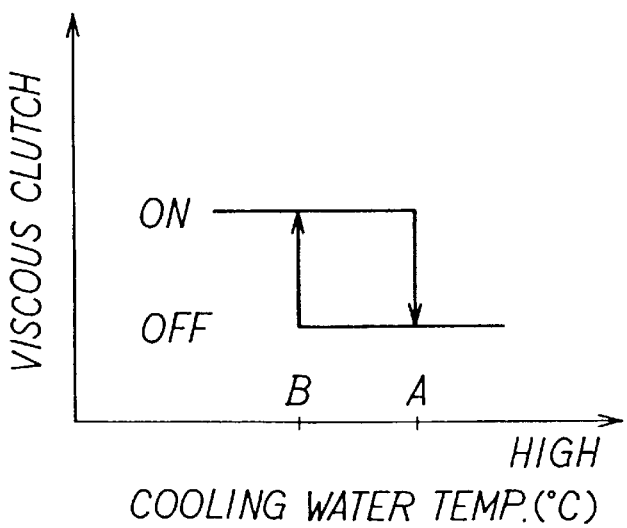
FIG. 7 is a characteristic graph showing a control of the viscous heater based on a temperature of the cooling water, executed by the air conditioning ECU, in the first embodiment.

More specifically, as shown in the characteristics graph of FIG. 7, a hysteresis is given between the set cooling water temperature (A: for example, 80° C.) and the set cooling water temperature (B: for example, 70° C.). When the cooling water temperature is equal to or higher than the set cooling water temperature, the electromagnetic coil 41 is set off, whereas when the cooling water temperature is equal to or lower than the set cooling water temperature, the electromagnetic coil 41 is set on. The hysteresis is given to the characteristics graph of FIG. 7; however, the hysteresis may not be given.

Further, when the cooling water temperature is lower than the set cooling water temperature, it performs a communication with (transmits a signal to and receives a signal from) the E/G ECU 200 (Step S5). Next, it is determined whether an allowable signal for allowing the electromagnetic coil 41 of the viscous clutch 7 to be turned on is received from the E/G ECU 200 (allowable signal determining means: Step S6). When the determination is "NO", it proceeds to the process at Step S3, and the electromagnetic coil 41 of the viscous clutch 7 is turned off.

When the determination is "YES" at Step S6, the electromagnetic coil 41 of the viscous clutch 7 is turned on, i.e., an electric current is supplied to the electromagnetic coil 41 of the viscous clutch 7 so that the rotor 53 of the viscous heater 9 is rotated (viscous heater actuating means: Step S7). Next, it proceeds to the process at Step S1.

Next, the E/G ECU 200 will be briefly described with reference to FIGS. 1, 5, 8 and 9.

The E/G ECU 200 for an engine control system is an electric circuit for performing a computer control of the engine E. The engine ECU 200 is a microcomputer in which a CPU, a ROM, and a RAM are incorporated.

The E/G ECU 200 controls an engine control of an idling rotational speed control (idle-up control) of the engine E, a fuel injection amount, a fuel injection timing, an intake air throttle, a supply of electric current to a glow plug, and the like, based on signals input from an engine rotational speed sensor 81, a vehicle speed sensor 82, the throttle opening sensor 83, and the A/C ECU 100, and the pre-stored control program. The E/G ECU 200 also transmits signals required for processes of the A/C ECU 100 to the A/C ECU 100.

The engine rotational speed sensor 81 corresponds to physical amount detecting means or operating state detecting means and engine rotational speed detecting means which detects a rotational speed of the output shaft 11 of the engine E and outputs an engine rotational speed signal to the E/G ECU 200. Instead of the engine rotational speed sensor 81, there may be employed physical amount detecting means for detecting a rotational speed of the shaft 8 of the viscous heater 9 or the rotor 53.

The vehicle speed sensor 82 employs, for example, a reed switch type vehicle speed sensor, a photo-electric switch type speed sensor, or a MRE (Magnetic Resistance Element) type vehicle sensor, and corresponds to vehicle speed detecting means for detecting a speed of the vehicle and outputs a vehicle speed signal to the E/G ECU 200.

The throttle opening sensor 83 which corresponds to throttle opening degree detecting means for detecting an opening degree of the throttle valve disposed in an intake pipe of the engine E and outputs a throttle opening signal to the E/G ECU 200.

Figure 8:
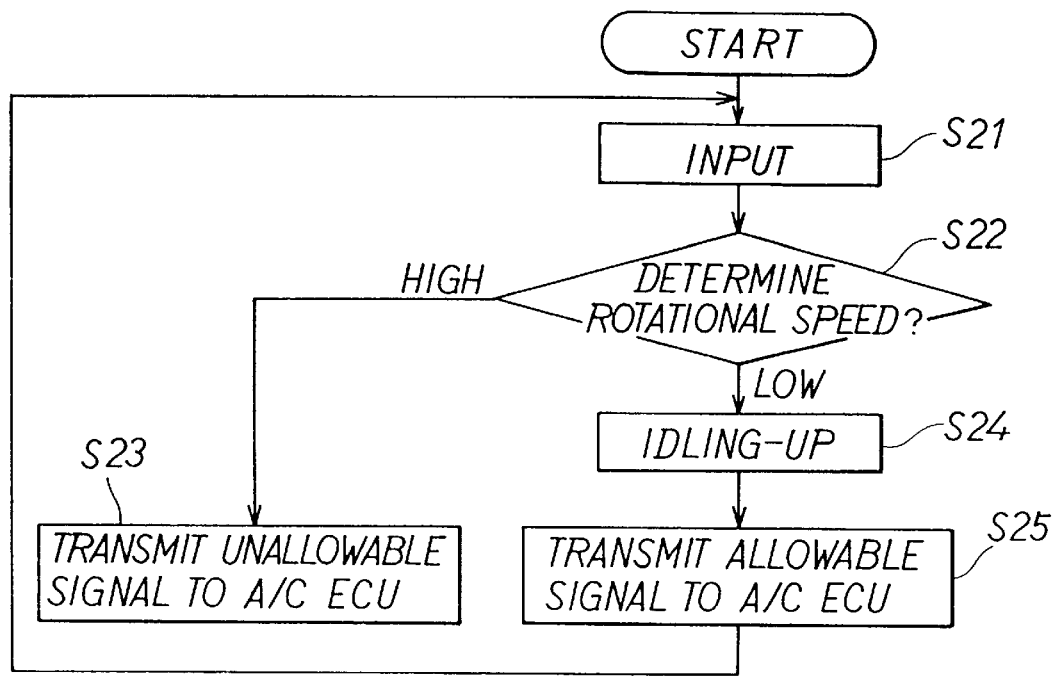
FIG. 8 is a flow chart showing a control program of an engine ECU in the first embodiment.

Next, a viscous heater control of the E/G ECU 200 will be briefly described with reference to FIGS. 1, 5, 8 and 9. FIG. 8 shows a flow chart of a control program of the E/G ECU 200.

Firstly, various kinds of sensor signals and switch signals are input (vehicle speed detecting means, throttle opening degree detecting means, engine rotational speed detecting means: step S21).

It is determined whether the electromagnetic coil 41 of the viscous clutch 7 is set on or off according to characteristics graph (see FIG. 9) of the viscous heater control based on the engine rotational speed, pre-stored in a memory circuit (for example, ROM). That is, it is determined whether or not the engine rotational speed detected by the engine rotational speed sensor 81 is higher or lower than the set engine rotational speed (the set value) (engine rotational speed determining means, operating state determining means: step S22).

Figure 9:
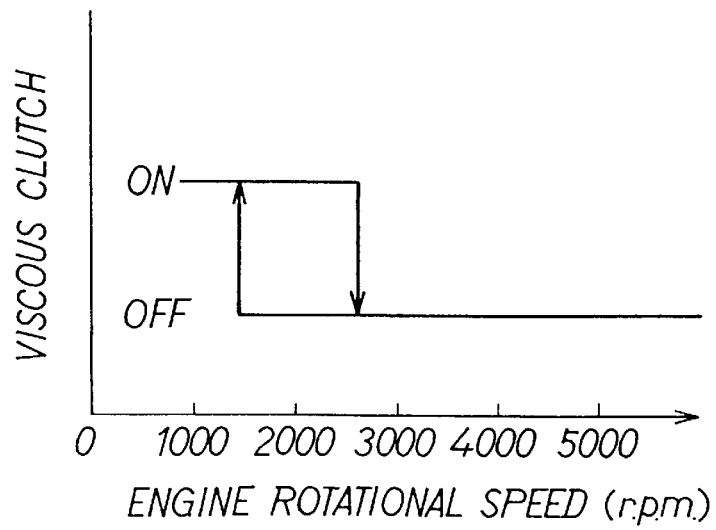
FIG. 9 is a characteristic graph showing a control of the viscous heater based on an engine rotational speed, executed by the engine ECU, in the first embodiment.

More specifically, as shown in the characteristics graph of FIG. 9, a hysteresis is given between the engine rotational speed 1500 (r.p.m.) and the engine rotational speed 2500 (r.p.m.). When the engine rotational speed is equal to or higher than the set engine rotational speed (high rotational speed), the electromagnetic coil 41 is set off, whereas when the engine rotational speed is equal to or lower than the set engine rotational speed (low rotational speed), the electromagnetic coil 41 is set on. The hysteresis is given to the characteristics graph of FIG. 9; however, the hysteresis may not be given.

Since the rotational driving force of the engine E is transmitted to the shaft 8 of the viscous heater 9 through the V-belt, the heat amount generated by the viscous heater 9 increases according to the engine rotational speed to cause thermal deterioration and mechanical deterioration of the viscous fluid by the abnormal heat of the viscous fluid in the heat-generating chamber 50. Therefore, as described above, when the engine rotational speed detected by the engine rotational speed sensor 81 is higher than the set engine rotational speed, an unallowable signal for not allowing the electromagnetic clutch 41 of the viscous clutch 7 to be turned on is transmitted to the A/C ECU 100.

When the determination at step S22 is "the high rotational speed", an unallowable signal for not allowing the electromagnetic clutch 41 of the viscous clutch 7 to be turned on is transmitted to the A/C ECU 100 (unallowable signal transmitting means: step S23). Next, it proceeds to the process at step S21. The process at step S23 may be omitted.

If the determination at step S22 is "the low rotational speed", when electric loads of the compressor (the A/C clutch 27) of the A/C unit 2 and the like or driving loads of the auxiliary equipment for the engine are applied while the engine is rotating with an idling rotational speed (in an idling state), an amount of intake air is increased to perform a control for increasing the idling rotational speed stepwise, so-called idle-up control (step S24).

When a predetermined time (e. g., 0.5–1.5 sec.) has passed since the idle-up control is performed at step S24, an allowable signal for allowing the electromagnetic clutch 41 of the viscous clutch 7 to be turned on is transmitted to the A/C ECU 100 (allowable signal transmitting means: step S25). Next, it proceeds to the process at step S21.

Next, an operation of the air-conditioning apparatus 1 according to the embodiment will be briefly described with reference to FIGS. 1–9.

When the engine E starts, the crankshaft 11 rotates, and the rotational driving force of the engine E is transmitted to the rotor 42 through the V-belt 6 of the belt transmitting mechanism 5. When the viscous switch 70 is set on, in a case where the cooling water temperature is lower than the set cooling water temperature (set value) and the allowable signal is received from the E/G ECU 200, the electromagnetic coil 41 of the viscous clutch 7 is turned on. That is, when the engine rotational speed is lower than the set engine rotational speed, the electromagnetic coil 41 is turned on, the armature 43 is attracted to the friction surface of the rotor 42 with magnetomotive force of the electromagnetic coil 41 to transmit the rotational driving force of the engine E to the inner hub 45 and the shaft 8.

In this way, since the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51, the cooling water is heated while absorbing heat generated by the viscous fluid through the fin portion 52a. The cooling water heated by the viscous heater 9 is supplied to the front heater core 15 so that the heating operation of the passenger compartment is performed with a large heating capacity.

Here, when the engine E starts, the crankshaft 11 rotates, and the rotational driving force of the engine E is transmitted to the rotor 42 through the V-belt 6 of the belt transmitting mechanism 5; however, even if the other conditions where the viscous heater 9 is used are satisfied, when the engine rotational speed is higher than the set engine rotational speed, the electromagnetic coil 41 of the viscous clutch 7 is turned off. Therefore, the armature 43 is not attracted to the friction surface of the rotor 42, and the rotational driving force of the engine E is not transmitted to the inner hub 45 and the shaft 8. In this way, the rotor 42 races simply, and the shaft 8 and the rotor 53 do not rotate. Therefore, a shearing force is not applied to the viscous fluid in the heat-generating chamber 50, and the temperature of the viscous fluid does not increase excessively.

The heating capacity of the viscous heater 9 may be set freely in advance by a viscous coefficient of the viscous fluid sealed in the heat-generating chamber 50. That is, the larger viscous coefficient the viscous fluid has, the larger the applying shearing force by the rotation of the rotor 53 becomes. Therefore, the heat-generating capacity of the rotor is increased, and the load and the fuel consumption rate of the engine E rise. On the other hand, the smaller viscous coefficient the viscous fluid has, the smaller the applying shearing force by the rotation of the rotor 53 becomes. Therefore, the heat-generating capacity of the rotor is decreased, and the load and the fuel consumption rate of the engine E lower.

As described above, according to this embodiment, when any one of conditions where the viscous heater 9 is used is not satisfied, the electromagnetic coil 41 of the viscous clutch 7 is turned off. Therefore, the rotational driving force of the engine E is not transmitted to the viscous heater 9 through the belt transmitting mechanism 5 and the viscous clutch 7, and the shaft 8 and the rotor 42 do not rotate. In this way, a shearing force is not applied to the viscous fluid in the heat-generating chamber 50, and the temperature of the viscous fluid does not increase excessively.

Figure 21:
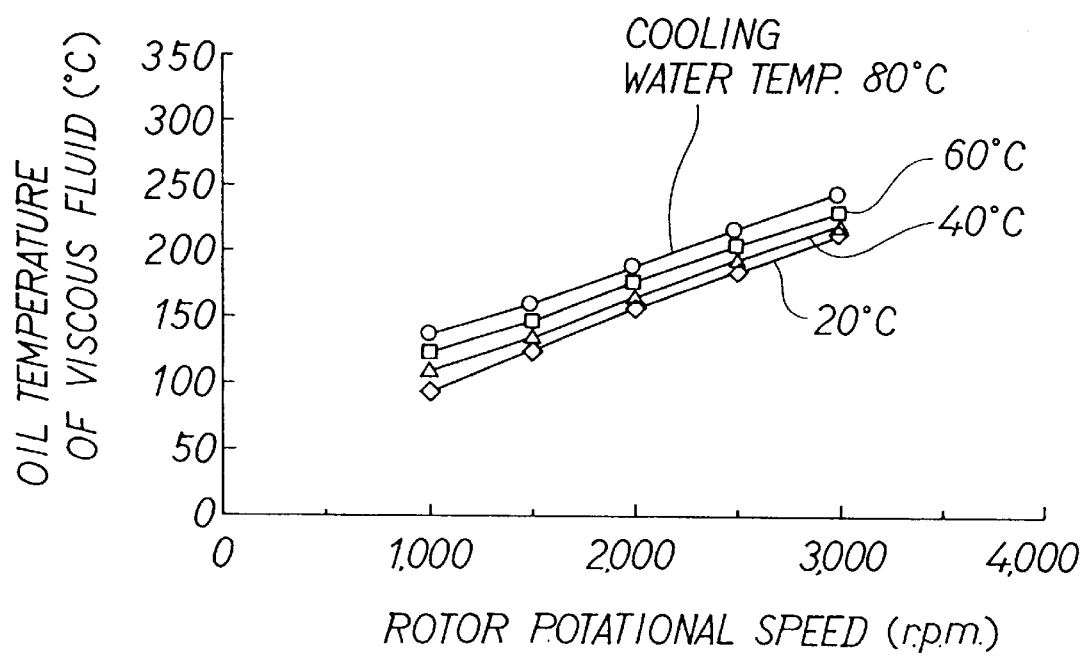
FIG. 21 is a graph showing a relationship between a rotational speed of the rotor and an oil temperature of the viscous fluid in a heat-generating chamber with reference to each temperature of the cooling water.

Here, as shown in a graph of FIG. 21, the viscous fluid in the heat-generating chamber 50 generates heat abnormally to cause the thermal deterioration of the viscous fluid, the mechanical deterioration by shearing, and the like, with the result that there occurs a problem in that the heat generating efficiency of the viscous fluid lowers. However, in this embodiment, when the engine rotational speed is higher than the set engine rotational speed, the electromagnetic coil 41 of the viscous clutch 7 is turned off; and therefore, such a problem can be prevented. In addition, by turning off the electromagnetic coil 41 of the viscous clutch 7, the driving torque is not applied to the V-belt 6, the V-pulley 47, the shaft 8 and the rotor 53, and the driving loads can be greatly reduced. Therefore, the fuel consumption rate of the engine E can be lowered, and the fuel economical performance (running cost) can be improved.

In this embodiment, when all conditions where the viscous heater 9 is used are satisfied, the electromagnetic coil 41 of the viscous clutch 7 is turned on, and the rotational driving force of the engine E is transmitted to the viscous heater 9 through the belt transmitting mechanism 5 and the viscous clutch 7. In this way, by operating the viscous heater 9, the cooling water which circulates through the cooling water passage 51 of the viscous heater 9 while absorbing the heat generated by the viscous fluid is supplied to the front heater core 15 and the rear heater core 16.

In this way, the temperature of the cooling water flowing into the front heater core 15 and the rear heater core 16 increases so that the temperature of the cooling water in the cooling water circuit W can be maintained approximately at a predetermined cooling water temperature (e.g., 80° C.). Therefore, a radiating amount of heat of the front heater core 15 or the rear heater core 16 increases, so that air heated sufficiently while passing through the front heater core 15 or the rear heater core 16 can be blown into the passenger compartment to prevent the heating capacity for the passenger compartment from being deteriorated.

In the air conditioning apparatus 1 according to this embodiment, when the E/C ECU 100 does not receive an allowable signal from the E/G ECU 200, the electromagnetic coil 41 of the viscous clutch 7 is turned off so that the driving loads (driving torque) for driving the engine E and the belt transmitting mechanism 5 can be reduced greatly. Therefore, the fuel consumption rate of the engine E can be lowered, and the fuel economical performance (running cost) can be improved. Further, a generation of noise such as chattering noise of the belt due to the slipping of the V-belt 6 or the viscous clutch 7 can be prevented, and the running performance of the vehicle and the driving performance (driveability) can be improved.

A second embodiment of the present invention will be described.

Figure 10:
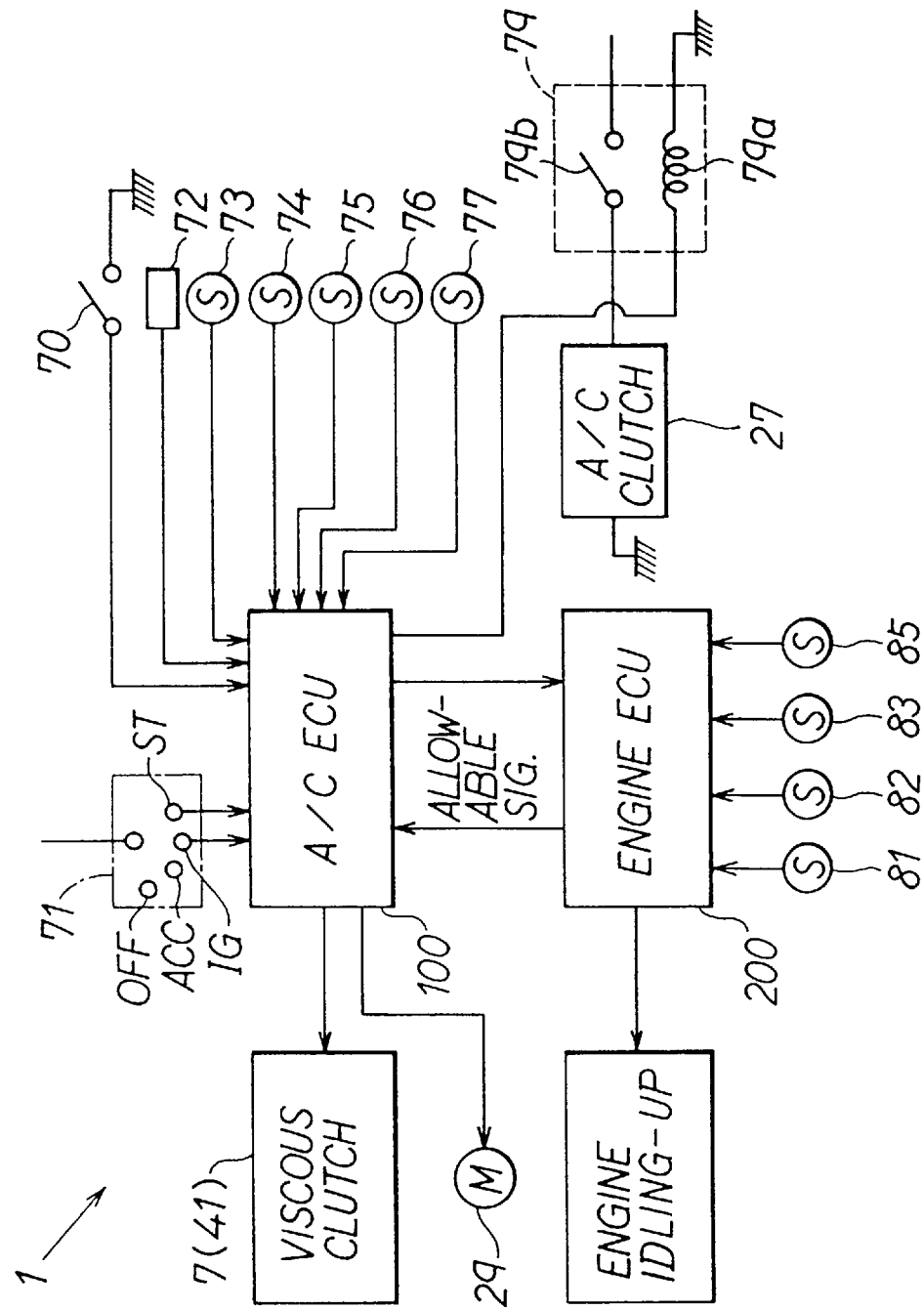
FIG. 10 is a block diagram showing an electric circuit of an air conditioning apparatus for a vehicle according to a second embodiment.
Figure 11:
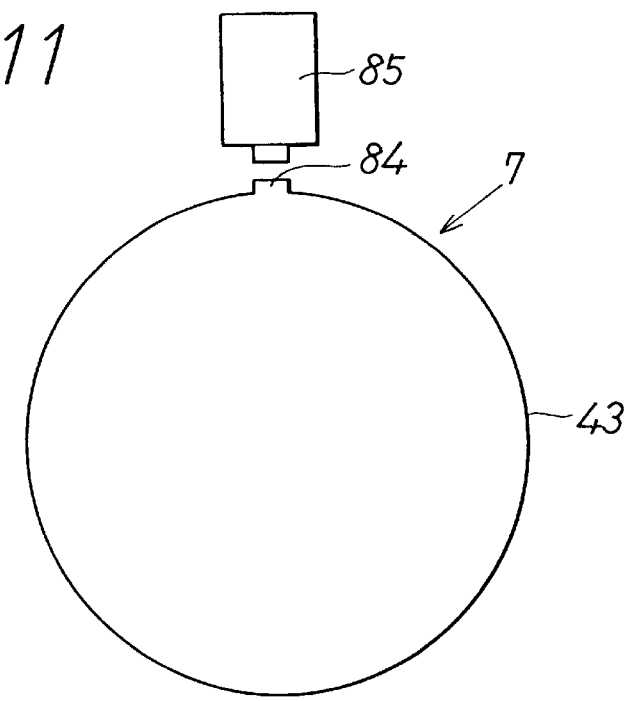
FIG. 11 is a schematic view showing an armature of a viscous clutch and a pickup sensor in the second embodiment; a control panel and a temperature control lever in the second embodiment.

FIGS. 10 and 11 show the second embodiment of the present invention, FIG. 10 shows an electric circuit of the air conditioning apparatus 1 for a vehicle, and FIG. 11 shows an armature of the viscous clutch and a pickup sensor.

In this embodiment, an automatic air conditioning system is employed as the air conditioning apparatus for a vehicle. In this embodiment, one or plural protrusions) 84 is(are) provided on an outer periphery of the armature 43 of the viscous clutch 7, and a pickup sensor (physical amount detecting means, rotational speed detecting means) 85 for transmitting an electric signal (pulse signal) when facing the protrusion 84 is disposed on a peripheral side of the armature 43.

The E/G ECU 200 calculates a rotational speed of the armature 43 from the number of the electric signals per unit time, which are transmitted from the pickup sensor 85. When the calculated rotational speed is higher than a set rotational speed (a rotational speed when a temperature of the viscous fluid is higher than, for example, 180–200° C.), the electromagnetic coil 41 of the viscous clutch 7 is turned off, so that the rotations of the shaft 8 and the rotor 53 is stopped to prevent the temperature of the viscous fluid in the heat-generating chamber 50 from increasing excessively. In this way, the effects similar to those in the first embodiment can be obtained.

Figure 12:
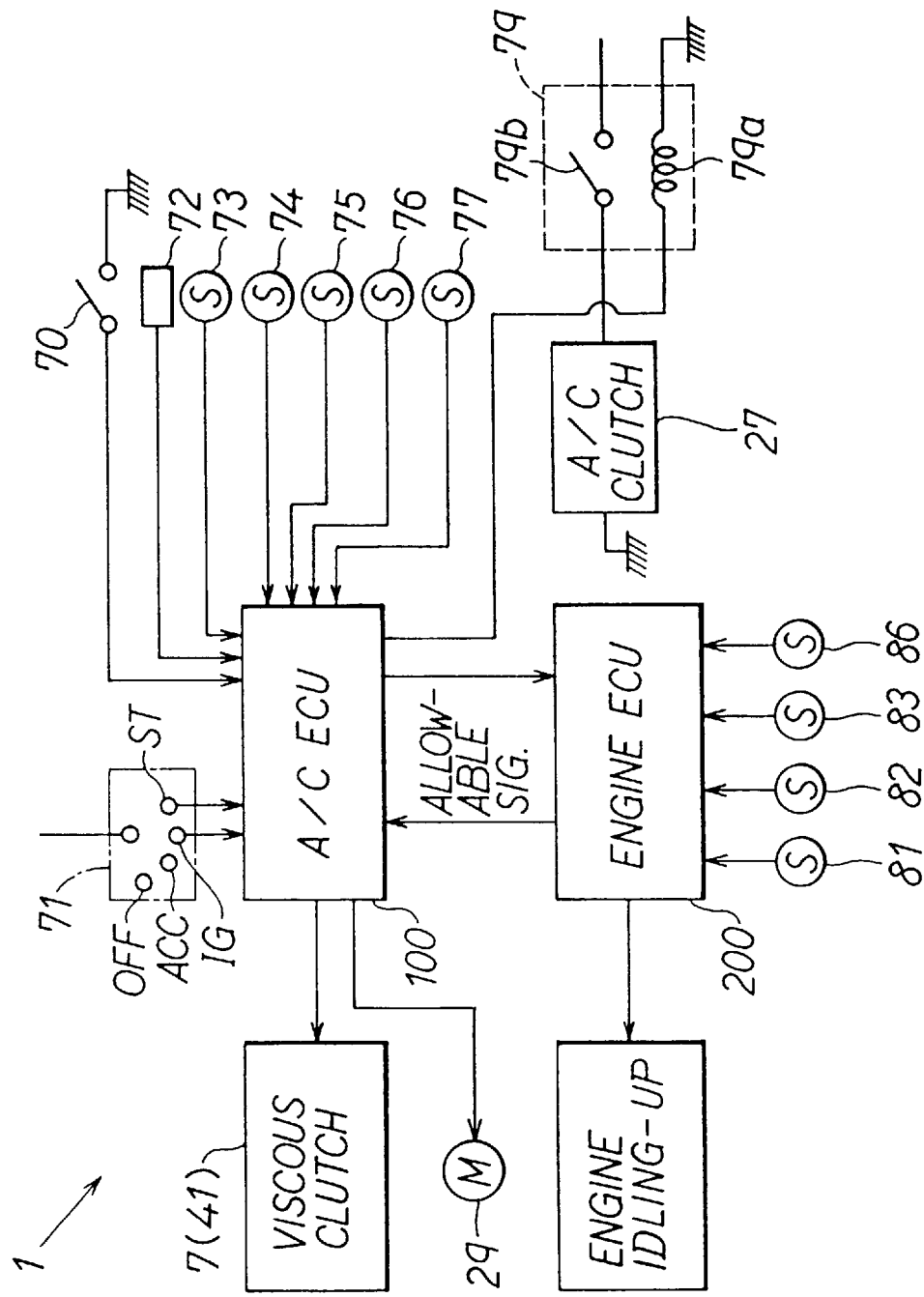
FIG. 12 is a block diagram showing an electric circuit of an air conditioning apparatus for a vehicle according to a third embodiment.
Figure 13:
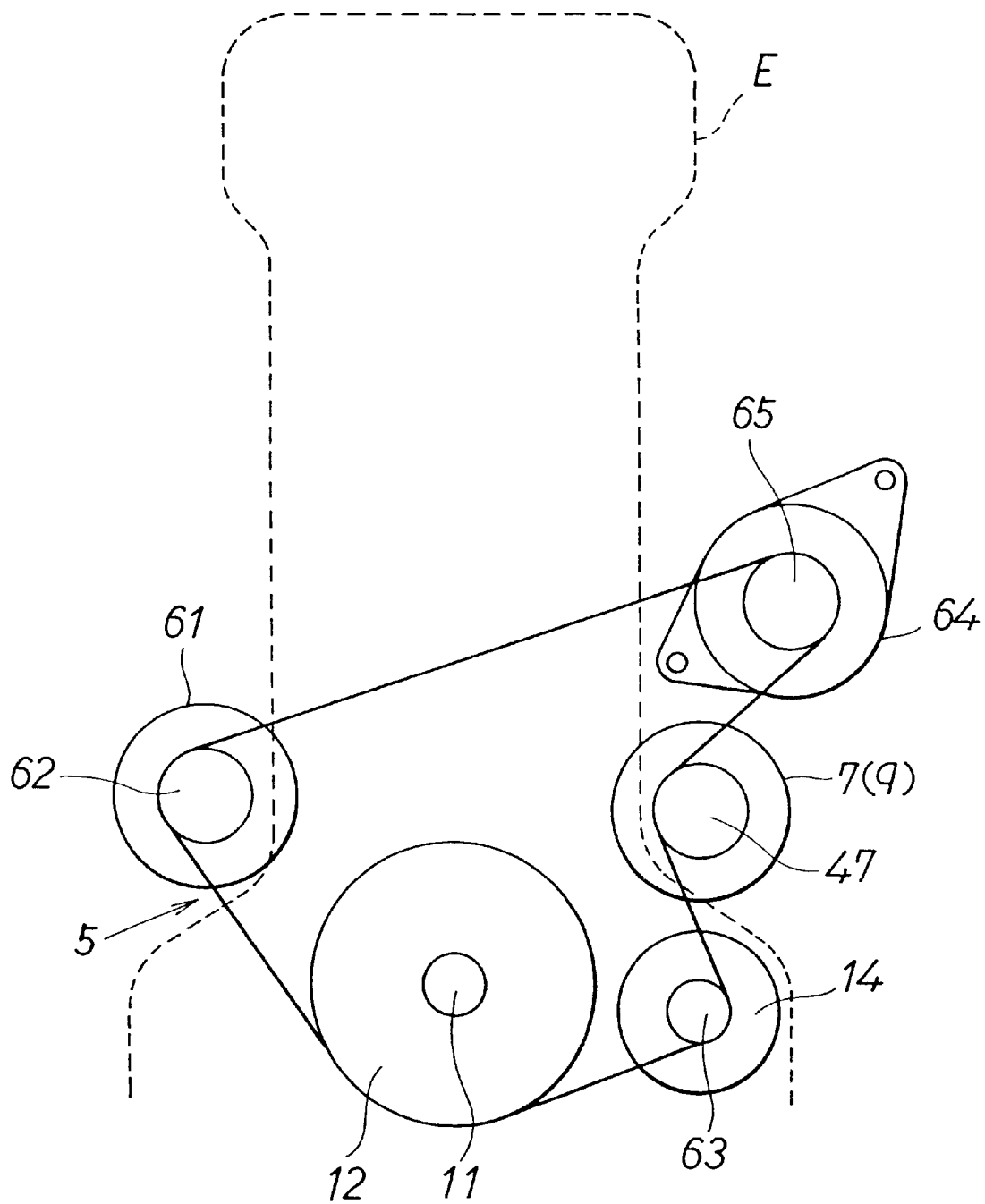
FIG. 13 is a schematic view showing an engine and a belt transmission mechanism in the third embodiment.

A third embodiment of the present invention will be described. FIGS. 12 and 13 show the third embodiment of the present invention, FIG. 12 shows an electric circuit of the air conditioning apparatus 1 for a vehicle, and FIG. 13 shows an engine and a belt transmitting mechanism.

In this embodiment, an automatic air conditioning system is employed as the air conditioning apparatus for a vehicle. In this embodiment, the V-belt 6 of the belt transmitting mechanism 5, hung between the crank pulley 12 provided on the crankshaft 11 of the engine E and the V-pulley 47 of the rotor 42 of the viscous clutch 7, is further hung on a V-pulley 62 provided on the A/C clutch of the compressor (auxiliary equipment for the engine) 61, a V-pulley 63 provided on a rotor of the water pump (auxiliary equipment for the engine) 14, and a V-pulley 65 provided on a rotor of an alternator (auxiliary equipment for the engine, AC generator) 64.

In this embodiment, there is provided a pickup sensor (physical amount detecting means, rotational speed detecting means) 86 for detecting any one of rotational speeds of the A/C clutch (rotating body) of the compressor 61, the rotor (rotating body) of the water pump 14, or the rotor (rotating body) of the alternator 64.

The E/G ECU 200 calculates a rotational speed of the auxiliary equipment from the number of the electric signals per unit time, which are transmitted from the pickup sensor 85. When the calculated rotational speed is higher than a set rotational speed (a rotational speed when a temperature of the viscous fluid is higher than, for example, 180–200° C.), the electromagnetic coil 41 of the viscous clutch 7 is turned off, so that the rotations of the shaft 8 and the rotor 53 is stopped to prevent the temperature of the viscous fluid in the heat-generating chamber 50 from increasing excessively. In this way, the effects similar to those in the first embodiment can be obtained.

A fourth embodiment of the present invention will be described.

Figure 14:
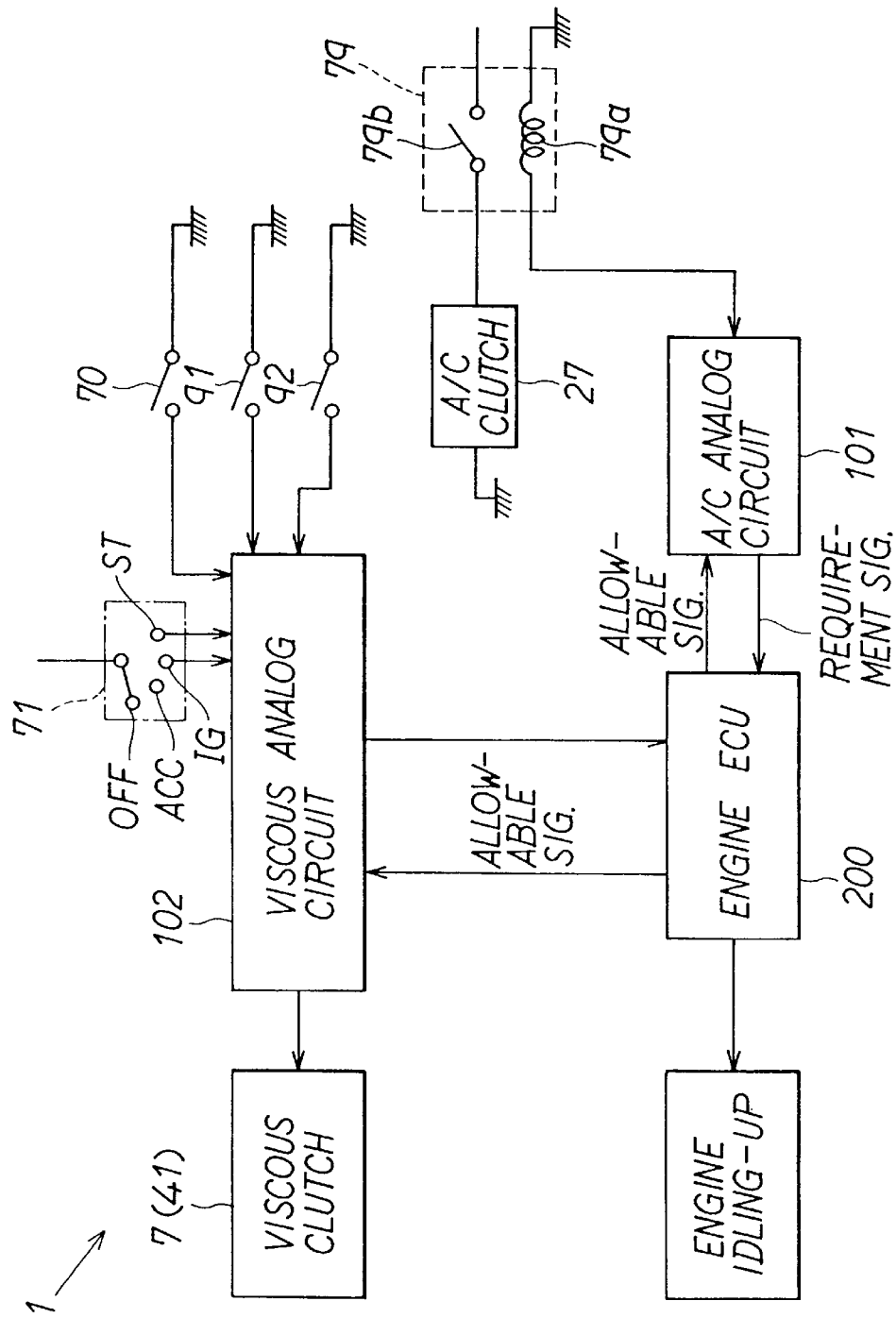
FIG. 14 is a block diagram showing an electric circuit of an air conditioning apparatus for a vehicle according to a fourth embodiment.

FIG. 14 shows an electric circuit of the air conditioning apparatus for a vehicle.

In this embodiment, a manual air conditioning system is employed as the air conditioning apparatus. In the electric circuit of the air conditioning apparatus 1 for a vehicle, instead of the A/C ECU 100, there are provided an air-conditioning analog circuit 101 (hereinafter referred to as "A/C analog circuit") for performing an analog control on the A/C unit 2 and a viscous analog circuit (heating control means) 102 for performing an analog control on the viscous clutch 7.

To an input portion 101 of the A/C analog circuit, there are connected the E/G ECU 200, various kinds of sensors and the like. To an output portion of the A/C analog circuit 101, there are connected the front blower 22, the servomotor 29 of the air-mixing damper 28, the rear blower 32, the relay coil 79a of the air-conditioning clutch relay 79, and the E/G ECU 200.

To an input portion of the viscous analog circuit 102, there are connected a ST terminal and an IG terminal of the ignition switch 71, a viscous switch 70, a cooling water temperature switch 91, a rotational speed detecting switch 92, and the E/G ECU 200. To an output portion of the viscous analog circuit 102, there are connected the E/G ECU 200 and the electromagnetic coil 41 of the viscous clutch 7.

The cooling water temperature switch 91 is opened when the temperature of the cooling water circulating in the cooling water circuit W (in this embodiment, the temperature of the cooling water at the outlet-side cooling water pipe 57b of the cooling water passage 51 of the viscous heater 9) is higher than a predetermined temperature A (e.g., 80° C.) and is closed when the outside air temperature is lower than the predetermined temperature A or another predetermined temperature B (e.g., 70–75° C.).

The rotational speed detecting switch 92, which corresponds to physical amount detecting means or operating state detecting means, is closed when the rotational speed of the crankshaft 11 (the V-belt 6, the armature 43 of the viscous clutch 7, the rotor 53 of the viscous heater 9) is higher than a set rotational speed A (e.g., 2500 r.p.m.) and is opened when the rotational speed of the crankshaft 11 (the V-belt 6, the armature 43 of the viscous clutch 7, the rotor 53 of the viscous heater 9) is lower than another set rotational speed B (e.g., 1500 r.p.m.).

Further, when receiving an ON signal transmitted in a case where the viscous analog circuit 102 determines that the viscous clutch 7 is set on, the E/G ECU 200 performs a calculation or determination based on the rotational speed of the engine E, the vehicle speed, the throttle opening degree, or the cooling water temperature and outputs to the viscous analog circuit 102 an allowable signal or unallowable signal for allowing or not allowing the A/C unit 2 or the viscous heater 9 to be turned on.

In this embodiment, even if the viscous switch 70 or the cooling water temperature switch 91 is set on (closed), at a time when the rotational speed detecting switch 92 is turned on (closed), the electromagnetic coil 41 of the viscous clutch 7 is turned off by the viscous analog circuit 102, so that rotations of the shaft 8 and the rotor 53 of the viscous heater 9 are stopped to prevent the temperature of the viscous fluid in the heat-generating chamber 50 from increasing excessively. In this way, the effects similar to those in the first embodiment can be obtained.

A fifth embodiment of the present invention will be described.

Figure 15:
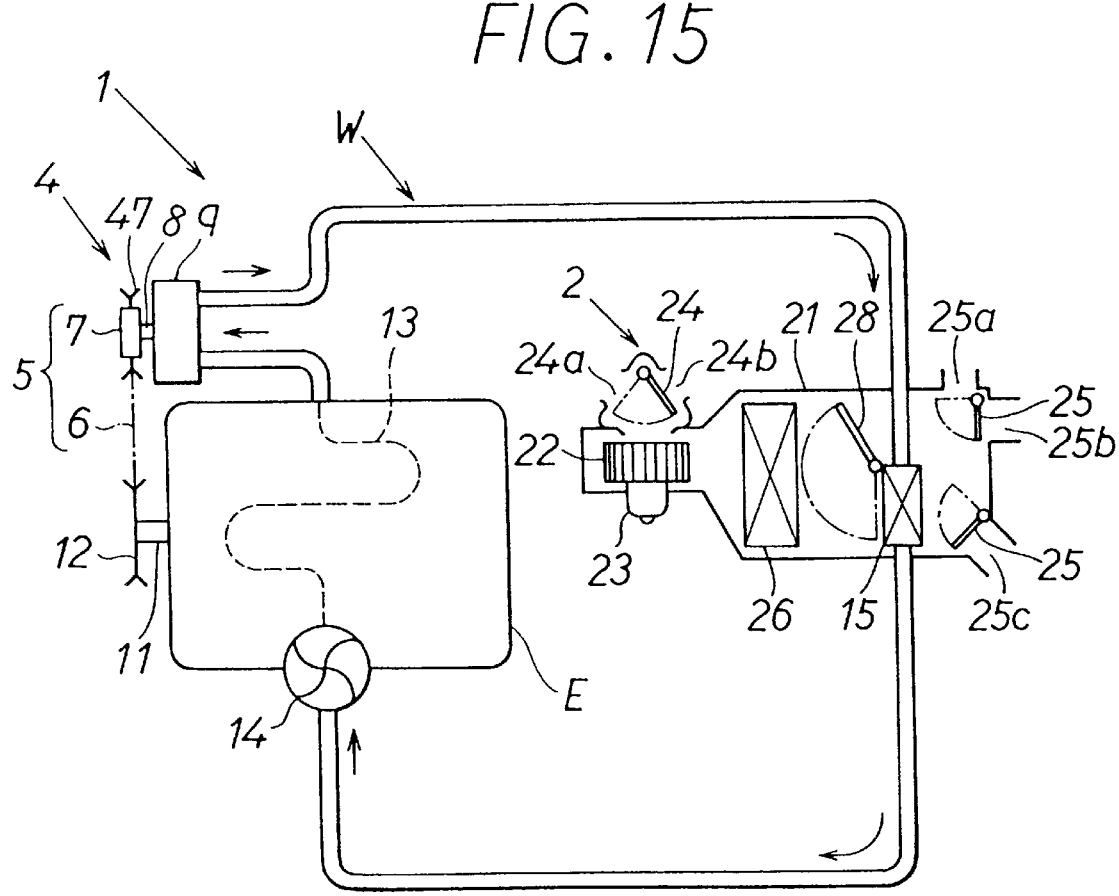
FIG. 15 is a schematic view showing an entire structure of an air conditioning apparatus for a vehicle, according to a fifth embodiment of the present invention.
Figure 16:
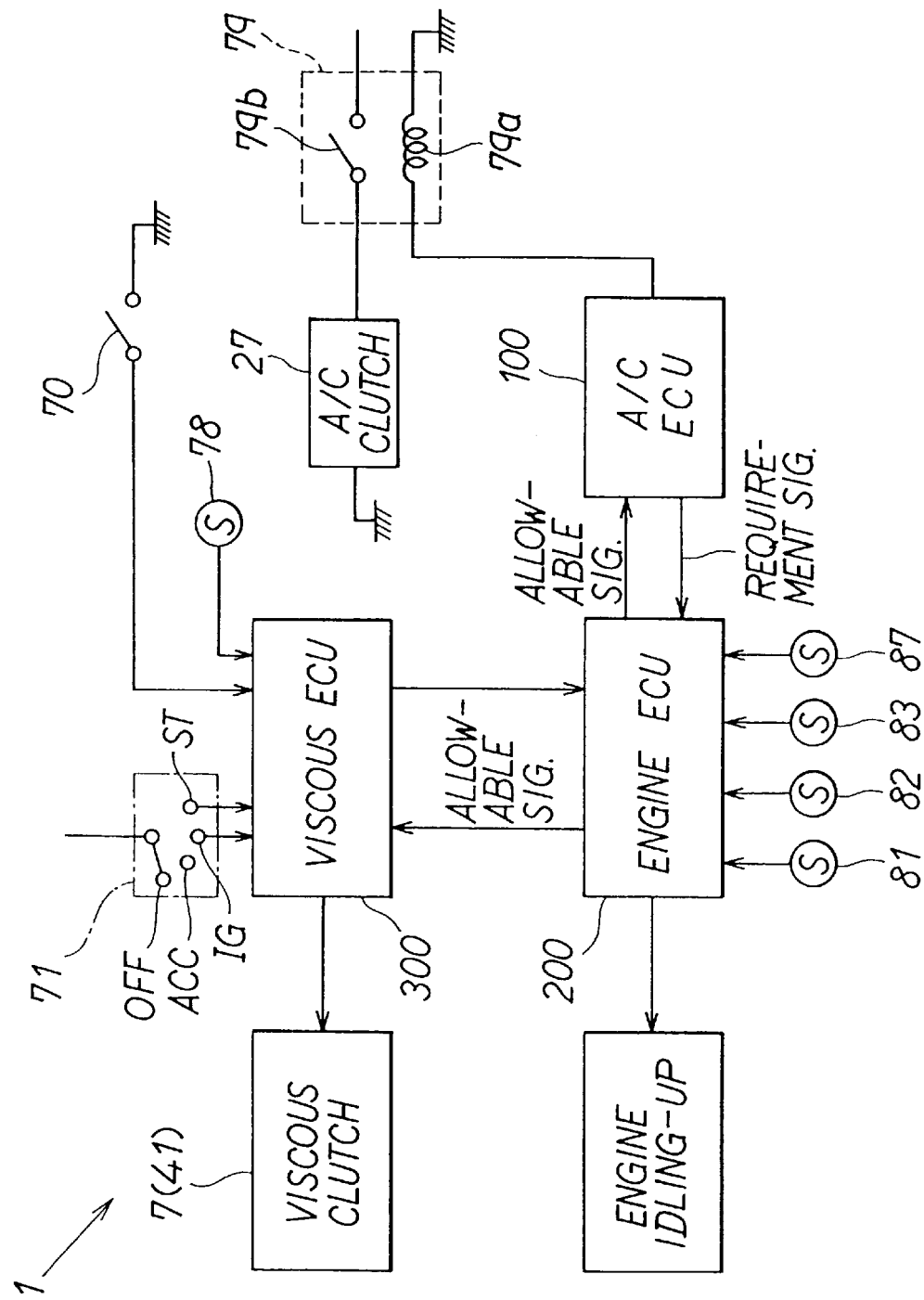
FIG. 16 is a block diagram showing an electric circuit of an air conditioning apparatus for a vehicle in the fifth embodiment.

FIGS. 15 to 19 show the fifth embodiment, FIG. 15 shows an entire structure of an air conditioning apparatus for a vehicle, and FIG. 16 shows an electric circuit of the air conditioning apparatus for a vehicle.

In this embodiment, an air conditioning apparatus 1 for a vehicle includes an A/C unit 2, a belt transmitting mechanism 5 connected to and driven by the crankshaft 11 of the engine E, a viscous heater 9, an A/C ECU 100 for controlling an electromagnetic coil of an A/C clutch 27 of the A/C unit 2, an E/G ECU 200 for controlling the engine E, a viscous ECU 300 for controlling the electromagnetic coil 41 of the viscous clutch 7, and the like.

The A/C unit 2 has the same construction as in the first embodiment. When the A/C clutch 7 is turned on to transmit a rotational driving force to a compressor through a V-belt 6, an evaporator cools and dehumidifies air passing through the duct 21. The belt transmitting mechanism 5 has the same construction as in the first embodiment, and includes the V-belt 6 hung on the crank pulley 12 of the engine E, and a viscous clutch 7 connected to and driven by the crankshaft 11 through the V-belt 6.

The E/G ECU 200 is connected to an input portion of the A/C ECU 100, and the relay coil 79a of the air-conditioning clutch relay 79 is connected to an output portion of the A/C ECU 100. To an input portion of the E/G ECU 200, there are connected an engine rotational speed sensor 81, a vehicle speed sensor 82, a throttle opening sensor 83, a cooling water temperature sensor 87, the A/C ECU 100, and the viscous ECU 300. Further, to an output portion of the E/G ECU 200, there are connected the A/C ECU 100 and the viscous ECU 300.

To an input portion of the viscous ECU 300, there are connected a viscous switch 70, an ignition switch 71, an oil temperature sensor 78, and the E/G ECU 200. Further, to an output portion of the viscous ECU 300, there are connected an electromagnetic coil 41 of the viscous clutch 7 of the viscous heater 9 and the E/G ECU 200.

The cooling water temperature 87 employs a thermistor, for example, corresponds to cooling water temperature detecting means for detecting a temperature of the cooling water in the cooling water circuit W (in this embodiment, a temperature of the cooling water having flowed out of the engine E), and outputs a cooling water temperature detection signal to the E/G ECU 200.

The oil temperature sensor 78 employs a thermistor, for example, corresponds to oil temperature detecting means for detecting a temperature of the viscous fluid (high-viscosity silicon oil) in the heat-generating chamber 50 (see FIG. 3), and outputs an oil temperature detection signal.

Figure 17:
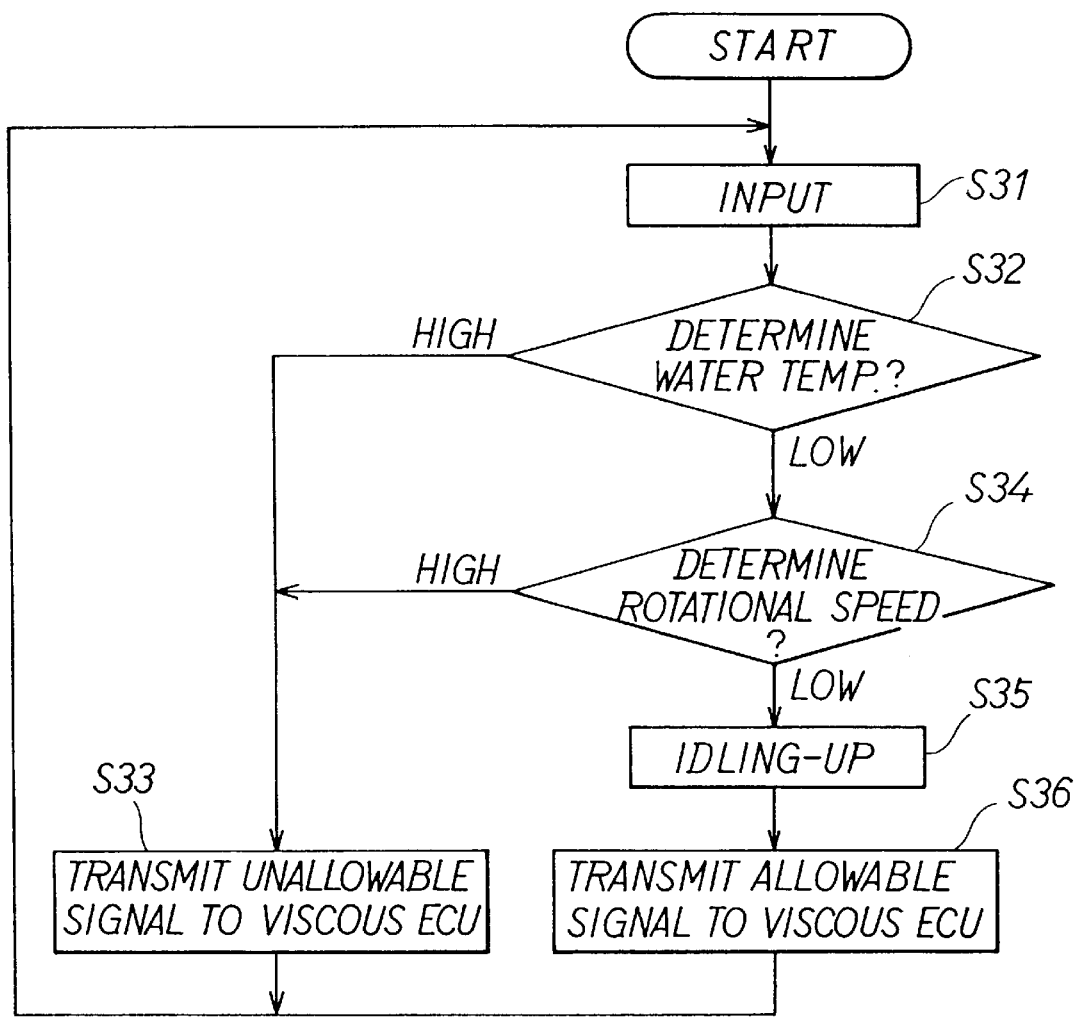
FIG. 17 is a flow chart showing a control program of an engine ECU in the fifth embodiment.

Next, a viscous heater control of the E/G ECU 200 will be briefly described with reference to FIGS. 15–17. FIG. 17 shows a flow chart of a control program of the E/G ECU 200.

Firstly, various kinds of sensor signals and switch signals are input (step S31).

Next, it is determined whether the electromagnetic coil 41 of the viscous clutch 7 is set on or off according to characteristics graph (see FIG. 7) of the viscous heater control based on the cooling water temperature, pre-stored in a memory circuit (for example, ROM). That is, it is determined whether or not the cooling water temperature detected by the cooling water temperature sensor 87 is higher or lower than a set cooling water temperature (the set value: e.g., 70–80° C.) (cooling water temperature determining means: step S32).

When the determination at step S32 is "the high temperature", an unallowable signal for not allowing the electromagnetic clutch 41 of the viscous clutch 7 to be turned on is transmitted to the viscous ECU 300 (unallowable signal transmitting means: step S33). Next, it proceeds to the process at step S31. The process at step S33 may be omitted.

When the determination at step S32 is "the low temperature", it is determined whether the electromagnetic coil 41 of the viscous clutch 7 is set on or off according to characteristics graph (see FIG. 9) of the viscous heater control based on the engine rotational speed, pre-stored in a memory circuit (for example, ROM). That is, it is determined whether or not the engine rotational speed detected by the engine rotational speed sensor 81 is higher or lower than a set engine rotational speed (the set value: e.g., 2500–5000 r.p.m.) (step S34). When the determination is "the high rotational speed", it proceeds to the process at step S33, an unallowable signal is transmitted to the viscous ECU 300.

When the determination at step S34 is "the low rotational speed", it performs a control for increasing the idling rotational speed, so-called idle-up control (step S35). When a predetermined time (e.g., 0.5–1.5 sec.) has passed since the idle-up control is performed at step S24, an allowable signal for allowing the electromagnetic clutch 41 of the viscous clutch 7 to be turned on is transmitted to the viscous ECU 300 (allowable signal transmitting means: step S36). Next, it proceeds to the process at step S31.

As described above, an operation of and a stop of the operation of the viscous heater 9 are controlled based on the engine rotational speed (rotor rotational speed) having a correlation with the oil temperature of the viscous fluid. Therefore, in the case of the engine rotational speed where the oil temperature of the viscous fluid in the heat-generating chamber 50 increases excessively higher than 200° C., the electromagnetic coil 41 of the viscous clutch 7 is turned off. In this embodiment, since the oil temperature of the viscous fluid is directly detected by the viscous ECU 300, it is not necessary to control the viscous heater by the engine rotational speed.

Figure 18:
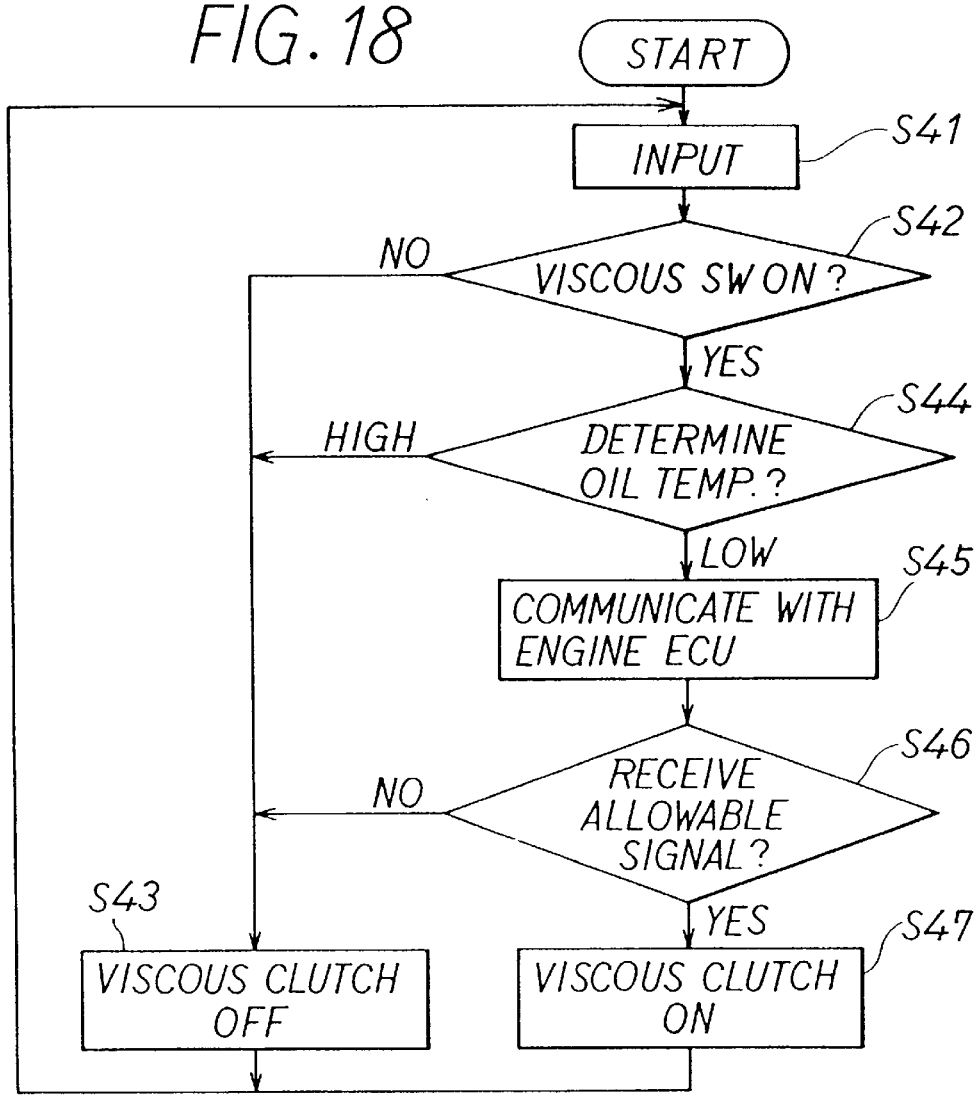
FIG. 18 is a flow chart showing a control program of a viscous ECU in the fifth embodiment.

Next, an viscous heater control of the viscous ECU 300 in this embodiment will be briefly described with reference to FIGS. 15 to 19. FIG. 18 shows a flow chart of a control program of the viscous ECU 300.

Firstly, various kinds of sensor signals and switch signals are input (physical amount detecting means, oil temperature detecting means: step S41).

Next, it is determined whether the viscous switch 70 is set on or off (step S42). When the determination is "NO", the electromagnetic coil 41 is turned off (step S43). Next, it proceeds to the process at step S41.

When the determination at step S42 is "YES", it is determined whether the electromagnetic coil 41 of the viscous clutch 7 is set on or off according to characteristics graph (see FIG. 19) of the viscous heater control based on the oil temperature of the viscous fluid, pre-stored in a memory circuit (for example, ROM). That is, it is determined whether or not the oil temperature of the viscous fluid, detected by the oil temperature sensor 78 is higher or lower than the set oil temperature (the set value) (physical amount determining means, oil temperature determining means: step S44). When the determination is "high temperature", it proceeds to the process at step S43, and the electromagnetic coil 41 of the viscous clutch 7 is turned off.

Figure 19:
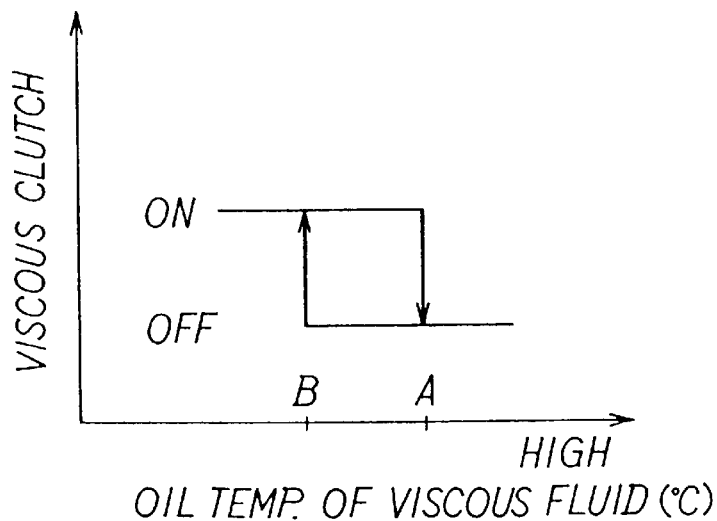
FIG. 19 is a characteristic graph showing a control of the viscous heater based on an oil temperature of the viscous fluid, executed by the viscous ECU, in the fifth embodiment.

More specifically, as for the set oil temperature, as shown in the characteristics graph of FIG. 19, a hysteresis is given between the set oil temperature (A: for example, 200° C.) and the set oil temperature (B: for example, 180° C.). When the oil temperature is equal to or higher than the set oil temperature, the electromagnetic coil 41 is set off, whereas when the oil temperature is equal to or lower than the set oil temperature, the electromagnetic coil 41 is set on. The hysteresis is given to the characteristics graph of FIG. 19; however, the hysteresis may not be given.

Since the rotational driving force of the engine E is transmitted to the shaft 8 of the viscous heater 9 through the V-belt, the heat amount generated by the viscous heater 9 increases according to the engine rotational speed to cause thermal deterioration and mechanical deterioration of the viscous fluid by the abnormal heat of the viscous fluid in the heat-generating chamber 50. Therefore, as described above, when the engine rotational speed detected by the engine rotational speed sensor 81 is higher than the set engine rotational speed, an unallowable signal for not allowing the electromagnetic clutch 41 of the viscous clutch 7 to be turned on is transmitted to the A/C ECU 100.

Further, when the determination at step S44 is "the low temperature", it performs a communication with (transmits a signal to and receives a signal from) the E/G ECU 200 (step S45). Next, it is determined whether an allowable signal for allowing the electromagnetic coil 41 of the viscous clutch 7 to be turned on is received from the E/G ECU 200 (allowable signal determining means: step S46).

When the determination is "NO", it proceeds to the process at step S43, and the electromagnetic coil 41 of the viscous clutch 7 is turned off. When the determination is "YES", the electromagnetic coil 41 of the viscous clutch 7 is turned on. Next, it proceeds to the process at step S41.

Conventionally, if the high-viscosity silicon oil is used as the viscous fluid, when the temperature of the oil itself as a material of the high-viscosity silicon oil is heated excessively higher than, for example, 200° C., thermal deterioration of the viscous fluid and mechanical deterioration by shearing may generate. However, in this embodiment, when the oil temperature of the viscous fluid in the heat-generating chamber 50 is higher than the set oil temperature (e.g., 180°200° C.), the electromagnetic coil 41 of the viscous clutch 7 is turned off to stop the rotation of the rotor 53. In this way, the shearing force is not applied to the viscous fluid in the heat-generating chamber 50.

Accordingly, the oil temperature of the viscous fluid is prevented from increasing excessively higher than 200° C., and thermal deterioration of the viscous fluid and the mechanical deterioration by shearing do not generate. In this way, since the heat-generating efficiency of the viscous fluid in the heat-generating chamber is prevented from being deteriorated, the cooling water to be supplied from the engine E to the front heater core 15 is heated sufficiently when the viscous heater 9 is operated; and therefore, sufficient heating capacity can be obtained.

Figure 20:
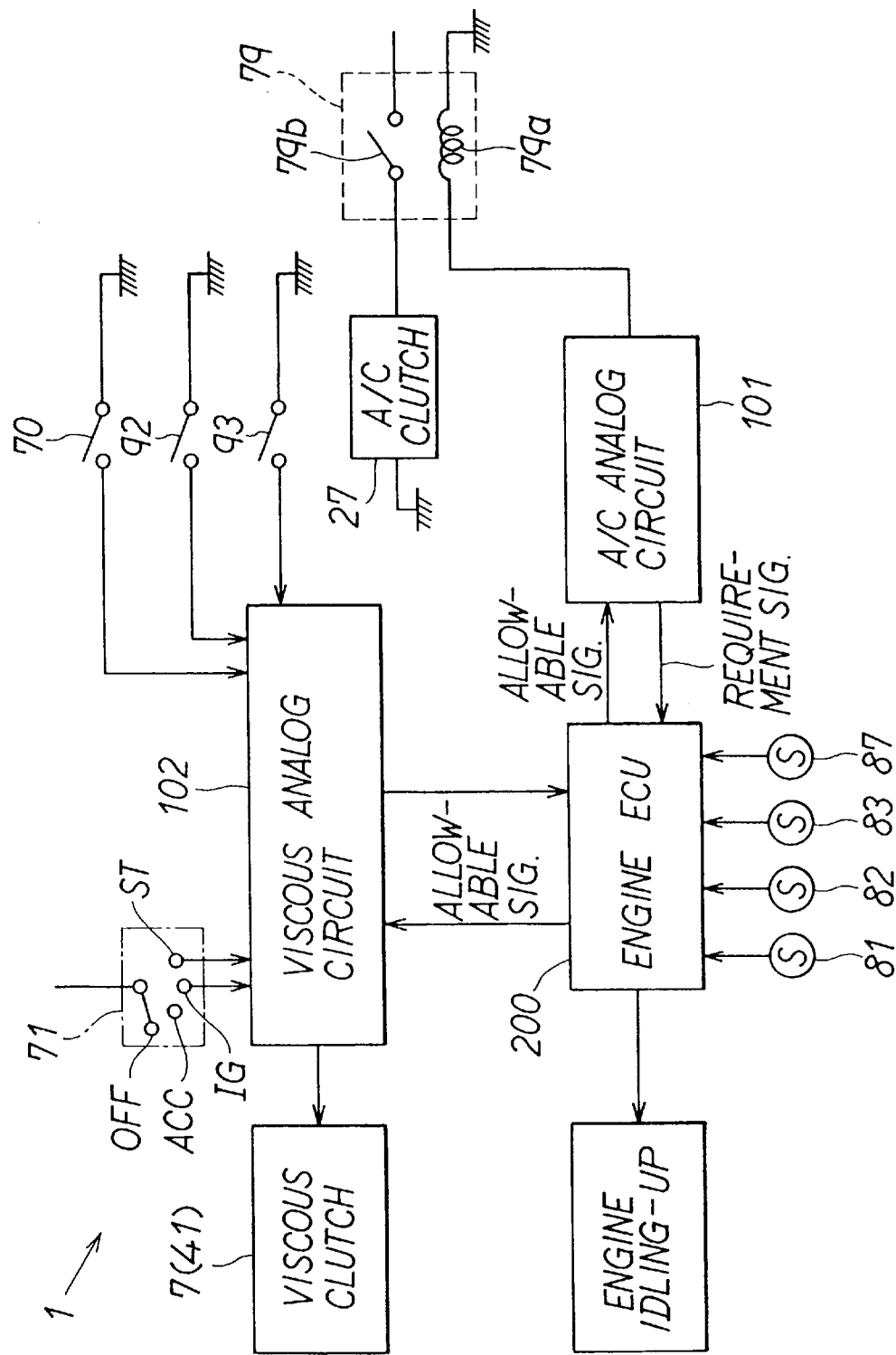
FIG. 20 is a block diagram showing an electric circuit of an air conditioning apparatus for a vehicle according to a sixth embodiment.

A sixth embodiment of the present invention will be described. FIG. 20 shows an electric circuit of the air conditioning apparatus for a vehicle in the sixth embodiment.

To an input portion of the viscous analog circuit 102, there are connected a ST terminal and an IG terminal of the ignition switch 71, a viscous switch 70, a rotational speed detecting switch 92, an oil temperature switch 93, and the E/G ECU 200.

The oil temperature switch 93 is closed when the temperature (oil temperature) of the viscous fluid in the heat-generating chamber is higher than a predetermined temperature A (e.g., 200° C.) and is opened when the oil temperature of the viscous fluid is lower than the predetermined temperature A or another predetermined temperature B (e.g., 180°200° C.).

In this embodiment, even if the viscous switch 70 is set on (closed), at a time when the rotational speed detecting switch 92 or the oil temperature switch 93 is turned on (closed), the electromagnetic coil 41 of the viscous clutch 7 is turned off by the viscous analog circuit 102, so that rotations of the shaft 8 and the rotor 53 of the viscous heater 9 are stopped to prevent the oil temperature of the viscous fluid in the heat-generating chamber 50 from increasing excessively. In this way, the effects similar to those in the first embodiment can be obtained. In this embodiment, the rotational speed detecting switch 92 may be omitted.

In each of the above-described embodiments, the belt transmitting mechanism 5 and the viscous clutch 7 are connected to and driven by the crankshaft 11 of the engine E to drive the shaft 8 of the viscous heater 9; however, the viscous clutch 7 may be connected directly to the crankshaft 11 of the engine E to drive the shaft 8 of the viscous heater 9. Further, between the output shaft 11 of the engine E and the viscous clutch 7 or between the viscous clutch 7 and the shaft 8 of the viscous heater 9, there may be connected a driving force transmitting apparatus (driving force transmitting means) such as a gear transmission having at least one stage gear and a V-belt type non-stage transmission.

Further, the viscous clutch 7 is omitted, and a V-belt type non-stage transmission may be connected to and driven by the crankshaft 11 of the engine E to drive the shaft 8 of the viscous heater 9. In this case, a pulley ratio between an input pulley and an output pulley of the V-belt type non-stage transmission is optimized so that driving loads of the engine E and the driving force transmitting apparatus such as the V-belt type non-stage transmission can be controlled the minimum value while operating the viscous heater 9.

In each of the above-described embodiments, the V-belt 6 of the belt transmitting mechanism 5 are hung on both of the viscous clutch 7 and the air-conditioning clutch 27; however, the V-belt 6 of the belt transmitting mechanism 5 may be hung on an auxiliary equipment for an engine, such as a blower apparatus for blowing cool air toward a radiator, a hydraulic pump for power steering, a hydraulic pump for supplying hydraulic fluid to the automatic transmission, a hydraulic pump for supplying lubricating oil to the engine E or the transmission, or an alternator for charging a battery mounted on a vehicle, with the viscous clutch 7.

In each of the above-described embodiments, a water-cooled diesel engine is employed as the engine E; however, the other water cooled engine such as a gasoline engine may be employed.

In each of the above-described embodiments, the present invention is applied to an air conditioning apparatus for a vehicle, capable of performing a heating operation and a cooling operation for the passenger compartment; however, the present invention may be applied to an air-conditioning apparatus for a vehicle, capable of performing only a heating operation for the passenger compartment.

In each of the above-described embodiments, the cooling water temperature sensor 76 is employed to detect a temperature of the cooling water at the outlet-side cooling water pipe 57b of the cooling water passage 51 of the viscous heater 9; however, there may be employed a cooling water temperature sensor or a cooling water temperature switch for detecting a temperature of the cooling water at an inlet-side of the front heater core 15 or the rear heater core 16. Further, there may be employed a cooling water temperature sensor or a cooling water temperature switch for detecting a temperature of the cooling water at an inlet-side of the engine E.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A heating apparatus for heating a passenger compartment of a vehicle having a water-cooled internal combustion engine, said heating apparatus comprising:

a heating heat exchanger for heating said passenger compartment by heat-exchanging between cooling water having cooled said water-cooled engine and air to be blown into said passenger compartment;

a heat-generating unit using a shearing force, said heat-generating unit having a rotor which rotates when a rotational driving force of said engine is applied thereto, a heat-generating chamber for sealing therein viscous fluid which generates heat when a shearing force generated by a rotational driving force of said rotor is applied thereto, and a cooling water passage in which the cooling water circulates between said engine and said heating heat exchanger, said heat-generating unit heating the cooling water to be supplied to said heating heat exchanger by generated heat of the viscous fluid in said heat-generating chamber;

shearing state switching means for switching a shearing state of the viscous fluid by the rotational driving force from said engine to said rotor;

detecting means for detecting a rotational speed of said rotor; and a heating control unit for controlling said shearing state switching means to reduce loads of said engine when the rotational speed of said rotor detected by said detecting means is more than a predetermined value.

2. A heating apparatus according to claim 1, wherein said heating control unit controls said shearing state switching means to minimize loads of said engine when the rotational speed of said rotor detected by said detecting means is more than the predetermined value.

3. A heating apparatus according to claim 1, wherein said shearing state switching means is a driving force transmitting unit for transmitting the rotational driving force of said engine to said rotor.

4. A heating apparatus according to claim 3, wherein,
said driving force transmitting unit includes a belt transmitting mechanism for transmitting the rotational driving force of said engine to a rotating body of an auxiliary equipment for said engine with said rotor, and
said detecting means is a rotational speed sensor for detecting a rotational speed of said rotating body.

5. A heating apparatus according to claim 1, wherein said detecting means is an engine rotation speed sensor for detecting a rotational speed of said engine.

6. A heating apparatus according to claim 1, wherein,
said driving force transmitting unit includes a clutch for intermitting a transmission of the rotational driving force from said engine to said rotor of said heat-generating unit, and
said detecting means is a rotational speed sensor for detecting a rotational speed of said clutch.

7. A heating apparatus according to claim 1, further comprising:
a cooling water temperature sensor for detecting a temperature of the cooling water;
wherein said heating control unit controls said shearing state switching means in accordance with the temperature of the cooling water, detected by said cooling water temperature sensor.

8. A heating apparatus for heating a passenger compartment of a vehicle having a water-cooled internal combustion engine, said heating apparatus comprising:
a heating heat exchanger for heating said passenger compartment by heat-exchanging between cooling water having cooled said water-cooled engine and air to be blown into said passenger compartment;
a heat-generating unit using a shearing force, said heat-generating unit having a rotor which rotates when a rotational driving force of said engine is applied thereto, a heat-generating chamber for sealing therein viscous fluid which generates heat when a shearing force generated by a rotational driving force of said rotor is applied thereto, and a cooling water passage in which the cooling water circulates between said engine and said heating heat exchanger, said heat-generating unit heating the cooling water to be supplied to said heating heat exchanger by generated heat of the viscous fluid in said heat-generating chamber;

shearing state switching means for switching a shearing state of the viscous fluid by the rotational driving force from said engine to said rotor;

detecting means for detecting a temperature of the viscous fluid in said heat-generating chamber; and a heating control unit for controlling said shearing state switching means to reduce loads of said engine when the temperature of the viscous fluid is higher than a predetermined value.

9. A heating apparatus according to claim 8, wherein said heating control unit controls said shearing state switching means to minimize loads of said engine when the temperature of the viscous fluid is higher than the predetermined value.

10. A heating apparatus according to claim 8, wherein said shearing state switching means is a driving force transmitting unit for transmitting the rotational driving force of said engine to said rotor.

11. A heating apparatus according to claim 10, wherein,
said driving force transmitting unit includes a clutch for intermitting a transmission of the rotational driving force from said engine to said rotor of said heat-generating unit.

12. A heating apparatus for heating a passenger compartment of a vehicle having a watercooled internal combustion engine, said heating apparatus comprising:
a heating heat exchanger for heating said passenger compartment by heat-exchanging between cooling water having cooled said water-cooled engine and air to be blown into said passenger compartment;
a heat-generating unit using a shearing force, said heat-generating unit having a rotor which rotates when a rotational driving force of said engine is applied thereto, a heat-generating chamber for sealing therein viscous fluid which generates heat when a shearing force generated by a rotational driving force of said rotor is applied thereto, and a cooling water passage in which the cooling water circulates between said engine and said heating heat exchanger, said heat-generating unit heating the cooling water to be supplied to said heating heat exchanger by generated heat of the viscous fluid in said heat-generating chamber;

shearing state switching means for switching a shearing state of the viscous fluid by the rotational driving force from said engine to said rotor;

rotational speed detecting means for detecting a rotational speed of said rotor;

a heating control unit for controlling said shearing state switching means to stop applying the rotational driving force of said engine to said rotor when the rotational speed of said rotor is more than a predetermined value.

* * * * *